US012651610B2

(12) United States Patent
Kasahara et al.

(10) Patent No.: US 12,651,610 B2
(45) Date of Patent: Jun. 9, 2026

(54) FLUORINE-CONTAINING ETHER COMPOUND, LUBRICANT FOR MAGNETIC RECORDING MEDIUM, AND MAGNETIC RECORDING MEDIUM

(71) Applicant: Resonac Corporation, Tokyo (JP)

(72) Inventors: Chizuru Kasahara, Tokyo (JP); Tsuyoshi Kato, Tokyo (JP); Natsumi Shibata, Tokyo (JP); Daisuke Yagyu, Tokyo (JP); Yutaka Tanji, Tokyo (JP); Takuma Kuroda, Tokyo (JP)

(73) Assignee: Resonac Corporation, Tokyo (JP)

( * ) Notice: Subject to any disclaimer, the term of this patent is extended or adjusted under 35 U.S.C. 154(b) by 1 day.

(21) Appl. No.: 18/577,777

(22) PCT Filed: Jun. 30, 2022

(86) PCT No.: PCT/JP2022/026256

§ 371 (c)(1),
(2) Date: Jan. 9, 2024

(87) PCT Pub. No.: WO2023/286626

PCT Pub. Date: Jan. 19, 2023

(65) Prior Publication Data

US 2024/0331726 A1 Oct. 3, 2024

(30) Foreign Application Priority Data

Jul. 14, 2021 (JP) ................................ 2021-116259

(51) Int. Cl.
*G11B 5/725* (2006.01)
*C08G 65/22* (2006.01)
(Continued)

(52) U.S. Cl.
CPC .......... *G11B 5/7257* (2020.08); *C08G 65/226* (2013.01); *C08G 65/3318* (2013.01);
(Continued)

(58) Field of Classification Search
CPC .............. C08G 65/226; C08G 65/3318; C08G 65/007; C10M 107/38; C10M 2213/0623;
(Continued)

(56) References Cited

U.S. PATENT DOCUMENTS 9,805,755 B1 10/2017 Yang
2017/0260472 A1 * 9/2017 Sagata ................ C10M 107/38
(Continued)

FOREIGN PATENT DOCUMENTS

WO 2009/066784 A1 5/2009
WO 2016/084781 A1 6/2016
(Continued)

*Primary Examiner* — Holly Rickman
*Assistant Examiner* — Lisa Chau
(74) *Attorney, Agent, or Firm* — Sughrue Mion, PLLC

(57) ABSTRACT

The present invention provides a fluorine-containing ether compound that can form a lubricating layer which can increase chemical substance resistance of a magnetic recording medium even if the thickness is thin, and can be suitably used as a material for a lubricant for a magnetic recording medium. The fluorine-containing ether compound is represented by the following formula. $R^1—CH_2—R^2—CH_2—OCH_2—CHR^3—CH_2O—CH_2—R^4—CH_2—R^5$ (in the formula, $R^2$ and $R^4$ are a perfluoropolyether chain; $R^1$ and $R^5$ are terminal groups which contain two or three hydroxyl groups, and in which respective hydroxyl groups are bonded to different carbon atoms, and carbon atoms to which the hydroxyl groups are bonded are bonded to each other via a linking group containing a carbon atom to which no hydroxyl group is bonded; $R^3$ is represented by the following formula; and $—(CH_2)_a—OH$ (a is an integer of 2 to 8)).

11 Claims, 1 Drawing Sheet

(51) Int. Cl.
*C08G 65/331* (2006.01)
*C10M 107/38* (2006.01)
*C10N 40/18* (2006.01)

(52) U.S. Cl.
CPC .. *C10M 107/38* (2013.01); *C10M 2213/0623* (2013.01); *C10N 2040/18* (2013.01)

(58) Field of Classification Search
CPC ......... C10M 2213/043; C10N 2040/18; C10N 2020/04; C10N 2030/00; C10N 2050/025; G11B 5/7257; G11B 5/70; G11B 5/725; G11B 5/84
See application file for complete search history.

(56) References Cited

U.S. PATENT DOCUMENTS

| | | | | |
|---|---|---|---|---|
| 2020/0002640 | A1 | 1/2020 | Lu et al. | |
| 2020/0263104 | A1* | 8/2020 | Yamaguchi .......... | G11B 5/7257 |
| 2022/0267516 | A1* | 8/2022 | Sagata ................. | C10M 105/66 |

FOREIGN PATENT DOCUMENTS

| | | | |
|---|---|---|---|
| WO | 2021/019998 | A1 | 2/2021 |
| WO | 2021/131961 | A1 | 7/2021 |

* cited by examiner

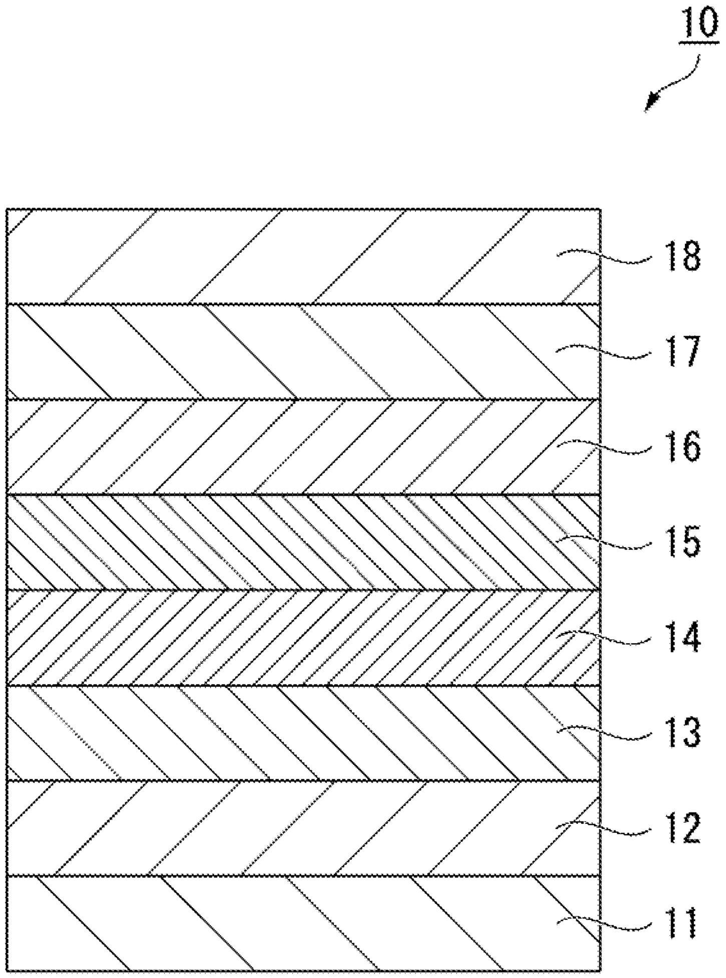
10
18
17
16
15
14
13
12
11

FLUORINE-CONTAINING ETHER COMPOUND, LUBRICANT FOR MAGNETIC RECORDING MEDIUM, AND MAGNETIC RECORDING MEDIUM

TECHNICAL FIELD

The present invention relates to a fluorine-containing ether compound, a lubricant for a magnetic recording medium, and a magnetic recording medium.

This application is a National Stage of International Application No. PCT/JP2022/026256 filed Jun. 30, 2022, claiming priority based on Japanese Patent Application No. 2021-116259, filed Jul. 14, 2021.

BACKGROUND ART

The development of magnetic recording media suitable for high recording densities has progressed in order to improve the recording densities of magnetic recording/reproducing devices. As a conventional magnetic recording medium, there has been a magnetic recording medium in which a recording layer is formed on a substrate and a protective layer made of carbon or the like is formed on the recording layer.

The protective layer protects information recorded in the recording layer and enhances the slidability of a magnetic head. In addition, the protective layer has a role of covering the recording layer to prevent a metal contained in the recording layer from being corroded by environmental contamination substances. However, sufficient durability of the magnetic recording medium cannot be obtained by simply providing the protective layer on the recording layer.

Therefore, a lubricant is applied to the surface of the protective layer to form a lubricating layer having a thickness of about 0.5 to 3 nm. The lubricating layer improves durability and protection of the protective layer and prevents contamination substances from entering inside of the magnetic recording medium.

As a lubricant used when the lubricating layer of the magnetic recording medium is formed, for example, one containing a compound having a polar group such as a hydroxyl group at the terminal of a fluorine polymer having a repeating structure containing $CF_2$ has been proposed (for example, refer to Patent Document 1). In addition, some lubricants have been proposed which contain a compound in which an aliphatic hydrocarbon chain having a hydroxyl group is disposed in the center of the molecule, and perfluoropolyethers are bonded to both sides thereof (for example, refer to Patent Document 2 to Patent Document 5).

CITATION LIST

Patent Document

Patent Document 1: WO2009/066784
Patent Document 2: U.S. Pat. No. 9,805,755
Patent Document 3: US2020/0002640
Patent Document 4: WO2021/019998
Patent Document 5: WO2016/084781

SUMMARY OF INVENTION

Technical Problem

There is a demand for a further decrease in the floating height of a magnetic head in magnetic recording/reproducing devices. This requires a further decrease in the thickness of a lubricating layer in magnetic recording media.

However, generally, if the thickness of the lubricating layer is reduced, the chemical substance resistance of the magnetic recording medium tends to be lowered.

The present invention has been made in view of the above circumstances, and an object of the present invention is to provide a fluorine-containing ether compound that can form a lubricating layer which can increase chemical substance resistance of a magnetic recording medium even if the thickness of the layer is thin, and can be suitably used as a material for a lubricant for a magnetic recording medium.

In addition, an object of the present invention is to provide a lubricant for a magnetic recording medium containing the fluorine-containing ether compound of the present invention.

In addition, an object of the present invention is to provide a magnetic recording medium having a lubricating layer containing the fluorine-containing ether compound of the present invention and having excellent chemical substance resistance.

Solution to Problem

The inventors conducted extensive studies in order to address the above problems.

As a result, it was found that a fluorine-containing ether compound in which a structure containing one primary hydroxyl group at the 2-position of a propanediol skeleton is disposed in the center of a chain structure, a perfluoropolyether chain, a methylene group, and a terminal group containing two or three hydroxyl groups are bonded in that order via a methylene group ($—CH_2—$) on both sides of the structure, and the distance between hydroxyl groups in the terminal group is appropriate could be used, and the present invention was completed.

That is, the present invention relates to the following aspects.

[1] A fluorine-containing ether compound represented by the following Formula (1):

$$R^1—CH_2—R^2—CH_2—OCH_2—CHR^3—CH_2O—CH_2—R^4—CH_2—R^5 \quad (1)$$

(in Formula (1), $R^2$ and $R^4$ are a perfluoropolyether chain; $R^1$ and $R^5$ are terminal groups which contain two or three hydroxyl groups, and in which respective hydroxyl groups are bonded to different carbon atoms, and carbon atoms to which the hydroxyl groups are bonded are bonded to each other via a linking group containing a carbon atom to which no hydroxyl group is bonded; and $R^3$ is represented by the following Formula (2)):

$$—(CH_2)_a—OH \quad (2)$$

(in Formula (2), a is an integer of 2 to 8).

[2] The fluorine-containing ether compound according to [1], wherein, in Formula (2), a is an integer of 3 to 6.

[3] The fluorine-containing ether compound according to [1] or [2], wherein, in Formula (1), $R^1$ and $R^5$ are each independently represented by any of the following Formulae (3-1) to (3-5):

(3-1)

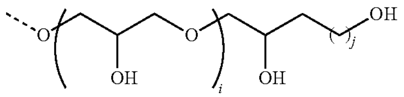

-continued

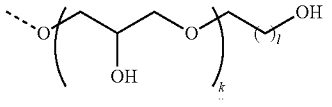

(3-2)

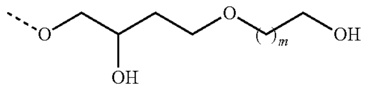

(3-3)

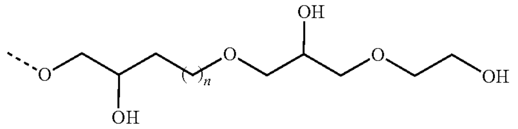

(3-4)

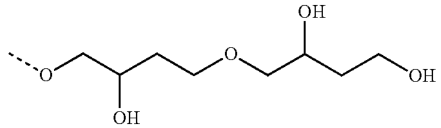

(3-5)

(in Formula (3-1), i is an integer of 0 to 1, and j is an integer of 1 to 4)

(in Formula (3-2), k is an integer of 1 to 2, and 1 is an integer of 1 to 3)

(in Formula (3-3), k is an integer of 1 to 3)

(in Formula (3-4), n is an integer of 1 to 2).

[4] The fluorine-containing ether compound according to any one of [1] to [3], wherein, in Formula (1), $R^2$ and $R^4$ are each independently represented by the following Formula (4):

$$-(CF_2)_vO-(CF_2O)_w-(CF_2CF_2O)_x-(CF_2CF_2CF_2O)_y-(CF_2CF_2CF_2CF_2O)_z-(CF_2)_{v'}- \quad (4)$$

(in Formula (4), w, x, y, and z indicate an average degree of polymerization, and are each independently a real number of 0 to 20; w, x, y, and z are not all 0 at the same time; v and v' are average values indicating the number of $-CF_2-$'s, and are each independently a real number of 1 to 3; and the arrangement order of repeating units in Formula (4) is not particularly limited).

[5] The fluorine-containing ether compound according to any one of [1] to [4], wherein, in Formula (1), $R^2$ and $R^4$ are each independently represented by any of the following Formulae (5) to (9):

$$-CF_2O-(CF_2O)_{w5}-(CF_2CF_2O)_{x5}-CF_2- \quad (5)$$

(in Formula (5), w5 and x5 indicate an average degree of polymerization and each independently are real numbers of 1 to 20)

$$-CF_2O-(CF_2CF_2O)_{x6}-CF_2- \quad (6)$$

(in Formula (6), x6 indicates an average degree of polymerization, and is a real number of 1 to 20)

$$-CF_2CF_2O-(CF_2CF_2CF_2O)_{y7}-CF_2CF_2- \quad (7)$$

(in Formula (7), y7 indicates an average degree of polymerization, and is a real number of 1 to 20)

$$-(CF_2)_{v8}O-(CF_2CF_2O)_{x8}-(CF_2CF_2CF_2O)_{y8}-(CF_2)_{v8'}- \quad (8)$$

(in Formula (8), x8 and y8 indicate an average degree of polymerization and each independently are real numbers of 1 to 20; and v8 and v8' are average values indicating the number of $-CF_2-$'s, and each independently are real numbers of 1 to 2)

$$-CF_2CF_2CF_2O-(CF_2CF_2CF_2CF_2O)_{z9}-CF_2CF_2CF_2- \quad (9)$$

(in Formula (9), z9 indicates an average degree of polymerization, and is a real number of 1 to 20).

[6] The fluorine-containing ether compound according to any one of [1] to [5], wherein, in Formula (1), $R^1$ and $R^5$ are the same.

[7] The fluorine-containing ether compound according to any one of [1] to [6], wherein, in Formula (1), $R^2$ and $R^4$ are the same.

[8] The fluorine-containing ether compound according to any one of [1] to [7], which has a number-average molecular weight in a range of 500 to 10,000.

[9] A lubricant for a magnetic recording medium which contains the fluorine-containing ether compound according to any one of [1] to [8].

[10] A magnetic recording medium in which at least a magnetic layer, a protective layer, and a lubricating layer are sequentially provided on a substrate, wherein the lubricating layer contains the fluorine-containing ether compound according to any one of [1] to [8].

[11] The magnetic recording medium according to [10], wherein the lubricating layer has an average film thickness of 0.5 nm to 2.0 nm.

Advantageous Effects of Invention

Since the fluorine-containing ether compound of the present invention contains the compound represented by Formula (1), it is possible to form a lubricating layer which can increase chemical substance resistance of the magnetic recording medium even if the thickness is thin and is suitable as a material for a lubricant for a magnetic recording medium.

Since the lubricant for a magnetic recording medium of the present invention contains the fluorine-containing ether compound of the present invention, it is possible to form a lubricating layer which can increase chemical substance resistance of the magnetic recording medium even if the thickness is thin.

Since a lubricating layer containing the fluorine-containing ether compound of the present invention is provided, the magnetic recording medium of the present invention exhibits excellent chemical substance resistance and has excellent reliability and durability.

BRIEF DESCRIPTION OF DRAWINGS

The FIGURE is a schematic cross-sectional view showing a magnetic recording medium according to one embodiment of the present invention.

DESCRIPTION OF EMBODIMENTS

Hereinafter, a fluorine-containing ether compound, a lubricant for a magnetic recording medium (hereinafter abbreviated as a "lubricant" in some cases) and a magnetic recording medium of the present invention will be described in detail. Here, the present invention is not limited only to the following embodiments.

[Fluorine-Containing Ether Compound]

The fluorine-containing ether compound of the present embodiment is represented by the following Formula (1).

$$R^1—CH_2—R^2—CH_2—OCH_2—CHR^3—CH_2O—CH_2—R^4—CH_2—R^5 \quad (1)$$

(in Formula (1), $R^2$ and $R^4$ are a perfluoropolyether chain; $R^1$ and $R^5$ are terminal groups which contain two or three hydroxyl groups, and in which respective hydroxyl groups are bonded to different carbon atoms, and carbon atoms to which the hydroxyl groups are bonded are bonded to each other via a linking group containing a carbon atom to which no hydroxyl group is bonded; and $R^3$ is represented by the following Formula (2)):

$$—(CH_2)_a—OH \quad (2)$$

(in Formula (2), a is an integer of 2 to 8).

"$R^1$ and $R^5$"

In the fluorine-containing ether compound represented by Formula (1), $R^1$ and $R^5$ are a terminal group containing two or three hydroxyl groups. Two or three hydroxyl groups contained in the terminal groups represented by $R^1$ and $R^5$ are bonded to different carbon atoms. In the terminal groups represented by $R^1$ and $R^5$, carbon atoms to which the hydroxyl groups are bonded are bonded to each other via a linking group containing a carbon atom to which no hydroxyl group is bonded.

Since the fluorine-containing ether compound represented by Formula (1) has terminal groups represented by $R^1$ and $R^5$, it has an appropriate surface energy. In addition, the lubricating layer containing the fluorine-containing ether compound represented by Formula (1) is brought into close contact with the protective layer by the hydroxyl groups contained in $R^1$ and $R^5$. Accordingly, the lubricating layer containing the fluorine-containing ether compound represented by Formula (1) can increase chemical substance resistance of the magnetic recording medium even if the thickness is thin.

On the other hand, for example, when some or all of the two or three hydroxyl groups contained in the terminal groups represented by $R^1$ and $R^5$ are bonded to the same carbon atom, or when carbon atoms to which the hydroxyl groups are bonded are directly bonded to each other, the number of hydroxyl groups that do not interact with the protective layer due to steric constraints in the molecular structure increases. Hydroxyl groups that are not involved in interaction with the protective layer increase the intermolecular force between the fluorine-containing ether compounds and promote aggregation of the fluorine-containing ether compounds. Aggregation of the fluorine-containing ether compounds is undesirable because the thickness of the lubricating layer formed using the fluorine-containing ether compound is less likely to become thin. In addition, hydroxyl groups that are not involved in interaction with the protective layer are undesirable because they become involved in interaction with impurities such as siloxane and promote chemical substance contamination of the lubricating layer containing the fluorine-containing ether compound.

In the fluorine-containing ether compound represented by Formula (1), a total number of hydroxyl groups contained in $R^1$ and hydroxyl groups contained in $R^5$ is 4 to 6. When the total number is 4 or more, the lubricating layer containing the fluorine-containing ether compound represented by Formula (1) has high adhesiveness (adhesion) to the protective layer. In addition, since the total number is 6 or less, in the magnetic recording medium having a lubricating layer containing the fluorine-containing ether compound represented by Formula (1), it is possible to prevent the polarity of the fluorine-containing ether compound from becoming too high and to prevent the occurrence of pickup in which the lubricating layer adheres as foreign matter (smear) to a magnetic head.

The number of hydroxyl groups contained in $R^1$ and the number of hydroxyl groups contained in $R^5$ are preferably the same. That is, preferably, $R^1$ and $R^5$ each contain two hydroxyl groups, or Ri and $R^5$ each contain three hydroxyl groups. In this case, the lubricating layer containing the fluorine-containing ether compound represented by Formula (1) adheres to the protective layer in a well-balanced manner. Therefore, a lubricating layer having a high coverage is easily obtained.

Specifically, the terminal groups represented by $R^1$ and $R^5$ are each independently preferably any of the following Formulae (3-1) to (3-5).

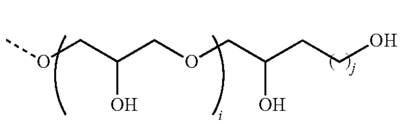

(3-1)

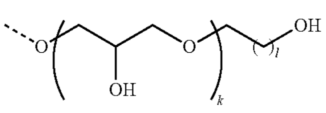

(3-2)

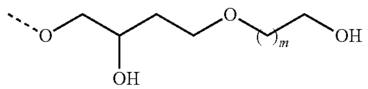

(3-3)

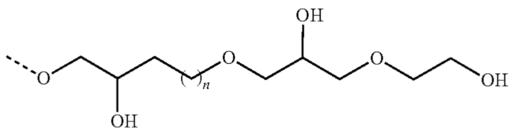

(3-4)

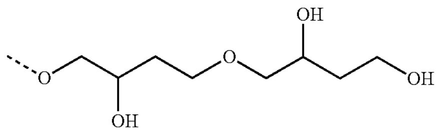

(3-5)

(in Formula (3-1), i is an integer of 0 to 1, and j is an integer of 1 to 4)$_P$ (in Formula (3-2), k is an integer of 1 to 2, and 1 is an integer of 1 to 3)

(in Formula (3-3), m is an integer of 1 to 3)

(in Formula (3-4), n is an integer of 1 to 2).

In the fluorine-containing ether compound represented by Formula (1), when $R^1$ and $R^5$ are each independently a terminal group represented by any of Formulae (3-1) to (3-5), a more appropriate surface energy is obtained due to a synergistic effect obtained by the inclusion of the following (a) to (c). As a result, when a lubricating layer is formed on the protective layer using the lubricant containing the compound, favorable interaction occurs between the lubricating layer and the protective layer. Accordingly, a lubricating layer containing the fluorine-containing ether compound in which Ri and $R^5$ are each independently a terminal group represented by any of Formulae (3-1) to (3-5) imparts better chemical substance resistance to a magnetic recording medium having the layer.

(a) The number of hydroxyl groups contained in each of $R^1$ and $R^5$ is 2 or 3.

(b) A linear linking group having an appropriate number of atoms is disposed between the carbon atom to which the terminal hydroxyl group disposed at the terminal end is bonded and the carbon atom to which the hydroxyl group adjacent to the terminal hydroxyl group is bonded.

(c) When the number of hydroxyl groups contained in $R^1$ and/or $R^5$ is 3, in the terminal group with three hydroxyl groups, a linear linking group having an appropriate number of atoms is disposed between the carbon atom to which a hydroxyl group disposed on the side of a perfluoropolyether chain is bonded and the carbon atom to which the hydroxyl group adjacent to this hydroxyl group is bonded.

In Formula (3-1), i is an integer of 0 to 1, and j is an integer of 1 to 4. The terminal group represented by Formula (3-1) does not contain an oxygen atom between the carbon atom to which the terminal hydroxyl group disposed at the terminal end is bonded and the carbon atom to which the hydroxyl group adjacent to the terminal hydroxyl group is bonded. Therefore, the fluorine-containing ether compound represented by Formula (1) having the terminal group represented by Formula (3-1) has a sufficiently low surface energy, and imparts better chemical substance resistance to the magnetic recording medium having a lubricating layer containing the compound.

Since i is 0 or 1, the terminal group represented by Formula (3-1) has two or three hydroxyl groups. Therefore, the fluorine-containing ether compound represented by Formula (1) has a sufficiently large number of hydroxyl groups that are involved in interaction with the protective layer, and can form a lubricating layer exhibiting excellent adhesion to the protective layer. In addition, the number of hydroxyl groups of the terminal group represented by Formula (3-1) is 3 or less. Therefore, for example, compared to when the terminal group has more than three hydroxyl groups, the surface energy of the fluorine-containing ether compound represented by Formula (1) is lower and the surface energy of the fluorine-containing ether compound is appropriate.

Since j is an integer of 1 or more, the terminal group represented by Formula (3-1) has a linking group having one or more methylene groups between the carbon atom to which the terminal hydroxyl group is bonded and the carbon atom to which the hydroxyl group adjacent to the terminal hydroxyl group is bonded. Therefore, the intramolecular interaction between the terminal hydroxyl group and the hydroxyl group adjacent to the terminal hydroxyl group is weak, and intramolecular aggregation is less likely to occur. As a result, a fluorine-containing ether compound that can form a lubricating layer which exhibits excellent adhesion to the protective layer and exhibits an excellent pickup preventing effect is obtained.

In the terminal group represented by Formula (3-1), j is an integer of 4 or less. Therefore, the number of carbon atoms contained in Formula (3-1) with respect to the number of hydroxyl groups contained in Formula (3-1) is in an appropriate range. Therefore, the terminal group represented by Formula (3-1) has a polarity suitable for interaction with the protective layer. Therefore, the lubricating layer containing the fluorine-containing ether compound represented by Formula (1) which has the terminal group represented by Formula (3-1) has better interaction with the protective layer.

In Formula (3-2), k is an integer of 1 to 2, and 1 is an integer of 1 to 3.

Since k is 1 or 2, the terminal group represented by Formula (3-2) has two or three hydroxyl groups. Therefore, the fluorine-containing ether compound represented by Formula (1) has a sufficiently large number of hydroxyl groups that are involved in interaction with the protective layer, and can form a lubricating layer exhibiting excellent adhesion to the protective layer. In addition, the number of hydroxyl groups of the terminal group represented by Formula (3-2) is 3 or less. Therefore, for example, compared to when the terminal group has more than three hydroxyl groups, the surface energy of the fluorine-containing ether compound represented by Formula (1) is lower and the surface energy of the fluorine-containing ether compound is appropriate.

The terminal group represented by Formula (3-2) contains an oxygen atom in a linking group disposed between the carbon atom to which the terminal hydroxyl group is bonded and the carbon atom to which the hydroxyl group adjacent to the terminal hydroxyl group is bonded. However, since I is an integer of 1 or more, the terminal group represented by Formula (3-2) has a linear linking group with one or more methylene groups connected between the carbon atom to which the terminal hydroxyl group is bonded and the oxygen atom (ether bond) adjacent to the terminal hydroxyl group. Therefore, mobility of molecules is appropriate, the intramolecular interaction between the terminal hydroxyl group and the hydroxyl group adjacent to the terminal hydroxyl group is weak, and intramolecular aggregation is less likely to occur. As a result, the fluorine-containing ether compound represented by Formula (1) having the terminal group represented by Formula (3-2) can form a lubricating layer exhibiting excellent adhesion to the protective layer and exhibiting an excellent pickup preventing effect.

In the terminal group represented by Formula (3-2), 1 is an integer of 3 or less. Accordingly, the fluorine-containing ether compound represented by Formula (1) having the terminal group represented by Formula (3-2) has a sufficiently low surface energy. As a result, the lubricating layer containing the fluorine-containing ether compound represented by Formula (1) can further increase chemical substance resistance of the magnetic recording medium.

The terminal group represented by Formula (3-3) contains an oxygen atom in a linking group disposed between the carbon atom to which the terminal hydroxyl group is bonded and the carbon atom to which the hydroxyl group adjacent to the terminal hydroxyl group is bonded. However, since m is an integer of 1 or more, the terminal group represented by Formula (3-3) has a linear linking group with one or more methylene groups connected between the carbon atom to which the terminal hydroxyl group is bonded and the oxygen atom (ether bond) adjacent to the terminal hydroxyl group, like the terminal group represented by Formula (3-2). In addition, the terminal group represented by Formula (3-3) has a linear linking group with two methylene groups connected between the oxygen atom (ether bond) adjacent to the terminal hydroxyl group and the carbon atom to which a hydroxyl group disposed on the side of the perfluoropolyether chain is bonded. Therefore, mobility of molecules is appropriate, the intramolecular interaction between the terminal hydroxyl group and the hydroxyl group adjacent to the terminal hydroxyl group is weak, and intramolecular aggregation is less likely to occur.

m in the terminal group represented by Formula (3-3) is an integer of 3 or less, similar to 1 in the terminal group represented by Formula (3-2). Therefore, the fluorine-containing ether compound represented by Formula (1) which has the terminal group represented by Formula (3-3) has a sufficiently low surface energy, like the terminal group represented by Formula (3-2).

In Formula (3-4), n is an integer of 1 to 2. In the terminal group represented by Formula (3-4), since n is 1 or 2, for example, compared to when n is 0, the intramolecular interaction between a hydroxyl group disposed on the side of the perfluoropolyether chain and a hydroxyl group adjacent to the hydroxyl group is weaker and intramolecular aggregation is less likely to occur. As a result, a fluorine-containing ether compound exhibiting excellent adhesion to the protective layer and exhibiting a favorable pickup preventing effect is obtained. In addition, in the terminal group represented by Formula (3-4), since n is 1 or 2, for example, compared to when n is 3, the surface energy of the fluorine-containing ether compound represented by Formula (1) is lower. In addition, since the terminal group represented by Formula (3-4) contains three hydroxyl groups, the fluorine-containing ether compound represented by Formula (1) which has the terminal group represented by Formula (3-4) can form a lubricating layer exhibiting excellent adhesion to the protective layer. Accordingly, the lubricating layer containing the fluorine-containing ether compound represented by Formula (1) which has the terminal group represented by Formula (3-4) can further increase chemical substance resistance of the magnetic recording medium.

The terminal group represented by Formula (3-5) does not contain an oxygen atom between the carbon atom to which the terminal hydroxyl group disposed at the terminal end is bonded and the carbon atom to which the hydroxyl group adjacent to the terminal hydroxyl group is bonded. Therefore, the fluorine-containing ether compound represented by Formula (1) which has the terminal group represented by Formula (3-5) has a sufficiently low surface energy. In addition, since the terminal group represented by Formula (3-5) contains three hydroxyl groups, it is possible to form a lubricating layer exhibiting excellent adhesion to the protective layer and exhibiting an excellent pickup preventing effect. Accordingly, the lubricating layer containing the fluorine-containing ether compound represented by Formula (1) which has the terminal group represented by Formula (3-5) can further increase chemical substance resistance of the magnetic recording medium.

In the fluorine-containing ether compound represented by Formula (1), $R^1$ and $R^5$ are preferably the same. When $R^1$ and $R^5$ are the same, a fluorine-containing ether compound which uniformly easily wets and spreads on the protective layer and allows a lubricating layer having a uniform film thickness to be easily obtained is obtained. As a result, the lubricating layer containing the fluorine-containing ether compound tends to have a favorable coverage and can further increase chemical substance resistance of the magnetic recording medium. In addition, when $R^1$ and $R^5$ are the same, the fluorine-containing ether compound may be produced more efficiently with fewer production processes than when $R^1$ and $R^5$ are different.

In the fluorine-containing ether compound represented by Formula (1), $R^3$ is a substituent containing one primary hydroxyl group, and is represented by the following Formula (2).

$$—(CH_2)_a—OH \quad (2)$$

(in Formula (2), a is an integer of 2 to 8).

In the substituent represented by Formula (2), a is an integer of 2 to 8, preferably an integer of 3 to 6, and more preferably an integer of 4 to 5.

Since a in the substituent represented by Formula (2) is 2 or more, the distance between the hydroxyl group contained in $R^3$ and the perfluoropolyether chains ($R^2$, $R^4$) is appropriate. Therefore, binding due to an electrostatic interaction between the hydroxyl group of $R^3$ in the lubricating layer containing the compound and the protective layer is less likely to be inhibited by the adjacent perfluoropolyether chains ($R^2$, $R^4$). Therefore, according to the electrostatic interaction between the hydroxyl group of $R^3$ in the lubricating layer and the protective layer, favorable adhesion between the lubricating layer and the protective layer is obtained. As a result, the lubricating layer containing the fluorine-containing ether compound represented by Formula (1) has a high coverage and can increase chemical substance resistance of the magnetic recording medium. In the substituent represented by Formula (2), a is preferably 3 or more and more preferably 4 or more.

In the lubricating layer containing the fluorine-containing ether compound represented by Formula (1), the perfluoropolyether chains ($R^2$, $R^4$) contained in the fluorine-containing ether compound have no electrostatic interaction with the protective layer. $R^2$ and $R^4$ in the lubricating layer form a film at a position with a distance of 3 Å or more from the protective layer. On the other hand, the hydroxyl group contained in the fluorine-containing ether compound can have an electrostatic interaction with the protective layer. However, in order for the hydroxyl group in the lubricating layer to have an electrostatic interaction with the protective layer, it is necessary to make the distance between the hydroxyl group and the protective layer close to about 2 Å.

Therefore, if the distance between the hydroxyl group contained in $R^3$ in the lubricating layer and $R^2$ and $R^4$ is too close, $R^2$ and $R^4$ that form a film at a position with a distance of 3 Å or more from the protective layer make it difficult for the hydroxyl group contained in $R^3$ to approach the protective layer. That is, the hydroxyl group contained in $R^3$ in the lubricating layer is inhibited from having an electrostatic interaction with the protective layer. As a result, it becomes difficult to obtain an electrostatic interaction between the hydroxyl group contained in $R^3$ in the lubricating layer and the protective layer, the adhesion between the lubricating layer and the protective layer becomes insufficient, and chemical substance resistance of the magnetic recording medium having a lubricating layer is lowered.

Specifically, for example, in the following two cases, the distance between the hydroxyl group contained in $R^3$ in the lubricating layer and $R^2$ and $R^4$ is too close.

(i) when $R^3$ in the fluorine-containing ether compound represented by Formula (1) is —OH (in other words, a in Formula (2) is 0);

(ii) when $R^3$ in the fluorine-containing ether compound represented by Formula (1) is $—CH_2OH$ (in other words, a in Formula (2) is 1).

Therefore, the hydroxyl group contained in $R^3$ in the lubricating layer is inhibited from having an electrostatic interaction with the protective layer. As a result, it becomes difficult for the hydroxyl group contained in $R^3$ in the lubricating layer to sufficiently exhibit a function as an adsorption unit to the protective layer.

In addition, since a in the substituent represented by Formula (2) is 2 or more, the hydroxyl group contained in $R^3$ has a sufficiently high degree of freedom in the molecule. Therefore, in the lubricating layer containing the fluorine-containing ether compound represented by Formula (1), the interaction between the hydroxyl group contained in $R^3$ and the protective layer is easily obtained and favorable adhesion to the protective layer is obtained.

On the other hand, for example, when $R^3$ is —OH or $—CH_2OH$, compared to the case of the substituent represented by Formula (2), the degree of freedom of the hydroxyl group contained in $R^3$ in the molecule is lower. Therefore, it is difficult to obtain the interaction between the hydroxyl group contained in $R^3$ and the protective layer, and sufficient adhesion to the protective layer is not obtained.

In addition, since a in the substituent represented by Formula (2) is 8 or less, the fluorine-containing ether compound applied onto the protective layer is unlikely to be bulky and a thin lubricating layer can be formed with a sufficient coverage. In addition, since a in the substituent represented by Formula (2) is 8 or less, the surface energy of the entire fluorine-containing ether compound molecule is sufficiently low, and a fluorine-containing ether compound that can form a lubricating layer which can increase chemical substance resistance of the magnetic recording medium is obtained. a in the substituent represented by Formula (2) is preferably 6 or less and more preferably 5 or less.

On the other hand, when a in the substituent represented by Formula (2) is more than 8, if the methylene chain contained in Formula (2) of the fluorine-containing ether compound applied onto the protective layer is perpendicular to the protective layer and interacts with the protective layer, a thin lubricating layer may not be obtained. In addition, when the methylene chain in Formula (2) is longer, the surface energy of the entire fluorine-containing ether compound molecule is higher and chemical substances easily adhere to the lubricating layer containing the compound. When a in the substituent represented by Formula (2) is more than 8, since the surface energy of the entire fluorine-containing ether compound molecule is high, sufficient chemical substance resistance is not obtained.

Accordingly, a lubricating layer containing the fluorine-containing ether compound in which $R^3$ is the substituent represented by Formula (2) has excellent adhesion to the protective layer, and can increase chemical substance resistance of the magnetic recording medium even if the thickness is thin.

In the fluorine-containing ether compound represented by Formula (1), a linking group that is bonded to $R^2$, a linking group that is bonded to $R^4$, and a hydrogen atom are bonded to the carbon atom to which $R^3$ is bonded. Therefore, $R^3$ in the lubricating layer containing the fluorine-containing ether compound represented by Formula (1) can approach the protective layer without being sterically hindered by atoms or atom groups other than $R^2$ or $R^4$. As a result, the fluorine-containing ether compound represented by Formula (1) can form a lubricating layer which exhibits excellent adhesion to the protective layer and can increase chemical substance resistance of the magnetic recording medium.

On the other hand, for example, when another atom or atom group in place of a hydrogen atom is bonded to the carbon atom to which $R^3$ is bonded in the fluorine-containing ether compound represented by Formula (1), $R^3$ is sterically hindered by the other atom or atom group. Therefore, it is difficult for $R^3$ in the lubricating layer to approach the protective layer, and adhesion to the protective layer tends to be insufficient.

In the fluorine-containing ether compound represented by Formula (1), the number of hydroxyl groups disposed between two perfluoropolyether chains ($R^2$, $R^4$) is only one hydroxyl group contained in $R^3$. Therefore, the fluorine-containing ether compound represented by Formula (1) has a smaller number of hydroxyl groups that are not involved in interaction with active sites on the protective layer than, for example, a fluorine-containing ether compound in which two or more hydroxyl groups are disposed between two perfluoropolyether chains. Therefore, the fluorine-containing ether compound represented by Formula (1) can form a lubricating layer which has favorable adhesion to the protective layer and to which substances that cause chemical substance contamination are unlikely to adhere.

In addition, in the fluorine-containing ether compound represented by Formula (1), perfluoropolyether chains ($R^2$, $R^4$) are disposed between $R^1$ and $—CHR^3—$, and between $—CHR^3—$ and $R^5$, respectively. Therefore, the distance between the hydroxyl group contained in $R^3$ and the hydroxyl group of the terminal groups represented by $R^1$ and $R^5$ is appropriate. Accordingly, binding of both the hydroxyl group contained in $R^3$ and the hydroxyl group of the terminal groups represented by $R^1$ and $R^5$ to active sites on the protective layer is unlikely to be inhibited by adjacent hydroxyl groups.

Therefore, in the fluorine-containing ether compound represented by Formula (1), the hydroxyl group of $R^3$ and the hydroxyl group of the terminal groups represented by $R^1$ and $R^5$ are both likely to be involved in binding to active sites on the protective layer. In other words, all the hydroxyl groups of the fluorine-containing ether compound of the present embodiment are unlikely to become hydroxyl groups that are not involved in binding to active sites on the protective layer. As a result, the lubricating layer containing the fluorine-containing ether compound of the present embodiment has a high coverage and can increase chemical substance resistance of the magnetic recording medium.

In addition, in the fluorine-containing ether compound, since the distance between the hydroxyl group of $R^3$ and the hydroxyl group of the terminal groups represented by $R^1$ and $R^5$ is appropriate, the hydroxyl group of $R^3$ is unlikely to aggregate with the hydroxyl group of the terminal groups represented by $R^1$ and $R^5$. Moreover, both ends of perfluoropolyether chains ($R^2$, $R^4$) are brought into close contact with the protective layer by the hydroxyl group of $R^3$ and the hydroxyl group of the terminal group represented by $R^1$ or the hydroxyl group of the terminal group represented by $R^5$. Therefore, the fluorine-containing ether compound applied onto the protective layer is unlikely to be bulky. Therefore, the fluorine-containing ether compound of the present embodiment easily wets and spreads on the protective layer and allows a lubricating layer having a uniform coating state to be easily obtained. As a result, the lubricating layer containing the fluorine-containing ether compound of the present embodiment can increase chemical substance resistance of the magnetic recording medium.

"$R^2$ and $R^4$"

In the fluorine-containing ether compound represented by Formula (1), $R^2$ and $R^4$ are a perfluoropolyether chain (hereinafter referred to as "PFPE chain" in some cases). When a lubricant containing the fluorine-containing ether compound of the present embodiment is applied onto the protective layer to form a lubricating layer, the PFPE chains represented by $R^2$ and $R^4$ cover the surface of the protective layer, impart lubricity to the lubricating layer, and reduce the frictional force between the magnetic head and the protective layer. $R^2$ and $R^4$ are appropriately selected depending on the performance required for the lubricant containing a fluorine-containing ether compound and the like.

$R^2$ and $R^4$ may be, for example, a structure represented by Formula (4) derived from a perfluoroalkylene oxide polymer or copolymer.

$$—(CF_2)_{v}O(CF_2O)_{x}(CF_2CF_2O)_{x}(CF_2CF_2CF_2O)_{y}(CF_2CF_2CF_2CF_2O)_{z}(CF_2)_{v}— \quad (4)$$

(in Formula (4), w, x, y, and z indicate average degrees of polymerization, and are each independently a real number of 0 to 20; w, x, y, and z are not all 0 at the same time; v and v' are average values indicating the number of $—CF_2—$'s, and are each independently a real number of 1 to 3; and the arrangement order of repeating units in Formula (4) is not particularly limited).

In Formula (4), w, x, y, and z indicate average degrees of polymerization, and are each independently a real number of 0 to 20, preferably a real number of 0 to 16, and more preferably a real number of 0 to 6. In Formula (4), v and v' are average values indicating the number of $—CF_2—$'s, and each independently a real number of 1 to 3. v and v' are determined according to the structure of repeating units disposed at the ends of the chain structure in the polymer represented by Formula (4).

In Formula (4), $(CF_2O)$, $(CF_2CF_2O)$, $(CF_2CF_2CF_2O)$, and $(CF_2CF_2CF_2CF_2O)$ are repeating units. The arrangement order of repeating units in Formula (4) is not particularly limited. In addition, the number of types of repeating units in Formula (4) is not particularly limited.

In Formula (1), $R^2$ and $R^4$ are each independently more preferably any of the following Formulae (5) to (9).

The arrangement order of repeating units $(CF_2CF_2O)$ and $(CF_2O)$ in Formula (5) is not particularly limited. Formula (5) may include any of a random copolymer, a block copolymer, and an alternating copolymer composed of monomer units $(CF_2CF_2O)$ and $(CF_2O)$.

The arrangement order of repeating units $(CF_2CF_2O)$ and $(CF_2CF_2CF_2O)$ in Formula (8) is not particularly limited. Formula (8) may include any of a random copolymer, a block copolymer, and an alternating copolymer composed of monomer units $(CF_2CF_2O)$ and $(CF_2CF_2CF_2O)$. In Formula (8), v8 and v8' are average values indicating the number of $—CF_2—$'s and are each independently a real number of 1 to 2. v8 and v8' are determined according to the structure of repeating units disposed at the ends of the chain structure in the polymer represented by Formula (8).

$$CF_2O—(CF_2O)_{w5}—(CF_2CF_2O)_{x5}—CF_2— \quad (5)$$

(in Formula (5), w5 and x5 indicate average degrees of polymerization and each independently are real numbers of 1 to 20)

$$—CF_2O—(CF_2CF_2O)_{x6}—CF_2— \quad (6)$$

(in Formula (6), x6 indicates the average degree of polymerization, and is a real number of 1 to 20)

$$—CF_2CF_2O—(CF_2CF_2CF_2O)_{y2}—CF_2CF_2— \quad (7)$$

(in Formula (7), y7 indicates the average degree of polymerization, and is a real number of 1 to 20)

$$—(CF_2)_{v8}O—(CF_2CF_2O)_{x8}—(CF_2CF_2CF_2O)_{y8}—(CF_2)_{v8'}— \quad (8)$$

(in Formula (8), x8 and y8 indicate average degrees of polymerization and each independently are real numbers of 1 to 20; and v8 and v8' are average values indicating the number of $—CF_2—$'s, and each independently are real numbers of 1 to 2) $—CF_2CF_2CF_2O—(CF_2CF_2CF_2CF_2O)_{z9}—CF_2CF_2CF_2—$ (9) (in Formula (9), z9 indicates the average degree of polymerization, and is a real number of 1 to 20).

w5 and x5 indicating the average degree of polymerization in Formula (5) are each independently a real number of 1 to 20. x6 indicating the average degree of polymerization in Formula (6) is a real number of 1 to 20. y7 indicating the average degree of polymerization in Formula (7) is a real number of 1 to 20. x8 and y8 indicating average degrees of polymerization in Formula (8) are each independently a real number of 1 to 20. z9 indicating the average degree of polymerization in Formula (9) is a real number of 1 to 20.

When the above w5, x5, x6, y7, x8, y8, and z9 are 1 or more, a fluorine-containing ether compound which can form a lubricating layer having favorable lubricity is obtained. When the above w5, x5, x6, y7, x8, and y8 are 20 or less, the viscosity of the fluorine-containing ether compound does not become too high, which makes it easier to apply a lubricant containing the compound. In addition, when the above z9 is 10 or less, the viscosity of the fluorine-containing ether compound does not become too high and a lubricant containing the compound is preferable because it is easier to apply.

In addition, w5 and x5 in Formula (5) is preferably 1 to 16 and more preferably 2 to 8, so that a fluorine-containing ether compound which easily wets and spreads on the protective layer and from which a lubricating layer having a uniform film thickness is easily obtained, is obtained. For the same reason, x6 in Formula (6) is preferably 1 to 16 and more preferably 2 to 8; y7 in Formula (7) is preferably 1 to 10 and more preferably 1 to 5; x8 and y8 in Formula (8) are preferably 1 to 10 and more preferably 1 to 5; and z9 in Formula (9) is more preferably 1 to 6 and still more preferably 1 to 3.

When $R^2$ and $R^4$ in Formula (1) are any of Formula (5) to Formula (9), this is preferable because it is easy to synthesize the fluorine-containing ether compound. When $R^2$ and $R^4$ are any of Formula (5) to Formula (7), this is more preferable because the raw material is easily obtained.

In addition, when $R^2$ and $R^4$ are any of Formula (6) to Formula (8), the ratio of the number of oxygen atoms (the number of ether bonds (—O—)) to the number of carbon atoms in the perfluoropolyether chain becomes appropriate. Therefore, a fluorine-containing ether compound having an appropriate hardness is obtained. Therefore, the fluorine-containing ether compound applied onto the protective layer is less likely to aggregate on the protective layer, and a thinner lubricating layer can be formed with sufficient coverage.

In the fluorine-containing ether compound represented by Formula (1), PFPE chains represented by $R^2$ and $R^4$ are preferably the same. Here, a case in which PFPE chains are the same also includes a case in which structures (types and numbers of repeating units) of PFPE chains are the same, but average degrees of polymerization are different. When PFPE chains represented by $R^2$ and $R^4$ are the same, there is no increase in asymmetry of the molecule caused by distortion in the molecule due to the difference in mobility of the PFPE chains. Therefore, it is speculated that it is possible to uniformly bring it in close contact with the protective layer and to increase the coverage of the protective layer.

In addition, since a fluorine-containing ether compound in which $R^2$ and $R^4$ are the same and $R^1$ and $R^5$ are also the same has a symmetrical structure centered around $—OCH_2—CHR^3—CH_2O—$, it is more preferable because it uniformly easily wets and spreads on the protective layer and can easily form a lubricating layer which has a uniform film thickness. In addition, a fluorine-containing ether compound in which $R^2$ and $R^4$ are the same and $R^1$ and $R^5$ are also the same can be easily and efficiently produced with fewer production processes.

Specifically, the fluorine-containing ether compound represented by Formula (1) is preferably any of the compounds represented by the following Formulae (A) to (J), and (O).

Here, in Formulae (A) to (J), and (O), xa1, xa2, xb1, xb2, zc1, zc2, yd1, yd2, ye1, ye2, yf1, yf2, yg1, yg2, xh1, xh2, wh1, wh2, xi1, xi2, yi1, yi2, xj1, xj2, wj1, wj2, xo1, and xo2 are values indicating average degrees of polymerization. Therefore, they are not necessarily integers.

In all of the compounds represented by the following Formulae (A) to (J), and (O), $R^1$ and $R^5$ are the same. In addition, in all of the compounds represented by the following Formulae (A) to (J), and (O), $R^2$ and $R^4$ are the same.

In the compound represented by the following Formula (A), $R^3$ is represented by Formula (2), and a in Formula (2) is 2. $R^1$ and $R^5$ are represented by Formula (3-1), and in Formula (3-1), i is 1, and j is 1. $R^2$ and $R^4$ are represented by Formula (6).

In the compound represented by the following Formula (B), $R^3$ is represented by Formula (2), and a in Formula (2) is 2. $R^1$ and $R^5$ are represented by Formula (3-2), and in Formula (3-2), k is 1, and 1 is 3. $R^2$ and $R^4$ are represented by Formula (6).

In the compound represented by the following Formula (C), $R^3$ is represented by Formula (2), and a in Formula (2) is 3. $R^1$ and $R^5$ are represented by Formula (3-4), and n in Formula (3-4) is 1. $R^2$ and $R^4$ are represented by Formula (9).

In the compound represented by the following Formula (D), $R^3$ is represented by Formula (2), and a in Formula (2) is 3. $R^1$ and $R^5$ are represented by Formula (3-2), and in Formula (3-2), k is 2, and 1 is 3. $R^2$ and $R^4$ are represented by Formula (7).

In the compound represented by the following Formula (E), $R^3$ is represented by Formula (2), and a in Formula (2) is 4. $R^1$ and $R^5$ are represented by Formula (3-2), and in Formula (3-2), k is 1, and 1 is 2. $R^2$ and $R^4$ are represented by Formula (7).

In the compound represented by the following Formula (F), $R^3$ is represented by Formula (2), and a in Formula (2) is 4. $R^1$ and $R^5$ are represented by Formula (3-2), and in Formula (3-2), k is 2, and 1 is 1. $R^2$ and $R^4$ are represented by Formula (7).

In the compound represented by the following Formula (G), $R^3$ is represented by Formula (2), and a in Formula (2) is 5. $R^1$ and $R^5$ are represented by Formula (3-2), and in Formula (3-2), k is 1, and 1 is 1. $R^2$ and $R^4$ are represented by Formula (7).

In the compound represented by the following Formula (H), $R^3$ is represented by Formula (2), and a in Formula (2) is 6. $R^1$ and $R^5$ are represented by Formula (3-1), and in Formula (3-1), i is 1, and j is 4. $R^2$ and $R^4$ are represented by Formula (5).

In the compound represented by the following Formula (I), $R^3$ is represented by Formula (2), and a in Formula (2) is 6. $R^1$ and $R^5$ are represented by Formula (3-3), and m in Formula (3-3) is 1. $R^2$ and $R^4$ are represented by Formula (5).

In the compound represented by the following Formula (J), $R^3$ is represented by Formula (2), and a in Formula (2) is 8. $R^1$ and $R^5$ are represented by Formula (3-3), and m in Formula (3-3) is 2. $R^2$ and $R^4$ are represented by Formula (5).

In the compound represented by the following Formula (O), $R^3$ is represented by Formula (2), and a in Formula (2) is 2. $R^1$ and $R^5$ are represented by Formula (3-5). $R^2$ and $R^4$ are represented by Formula (6).

(A)

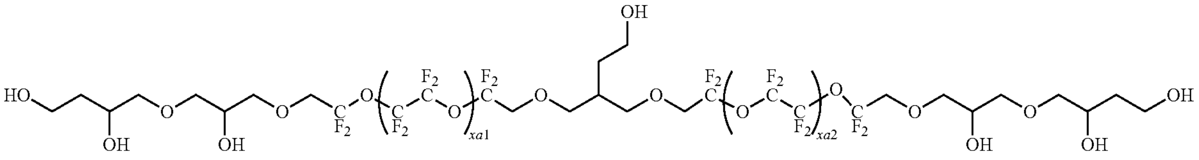

(B)

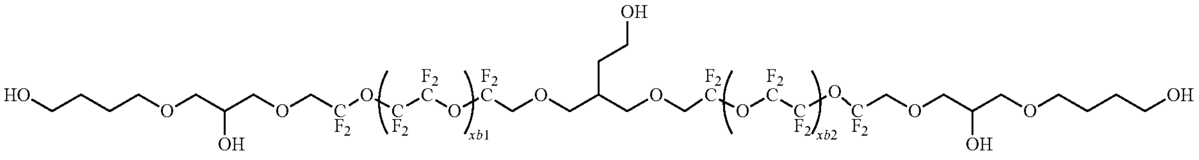

(in Formula (A), xa1 and xa2 indicate average degrees of polymerization and each independently are real numbers of 1 to 20).

(in Formula (B), xb1 and xb2 indicate average degrees of polymerization and each independently are real numbers of 1 to 20).

(C)
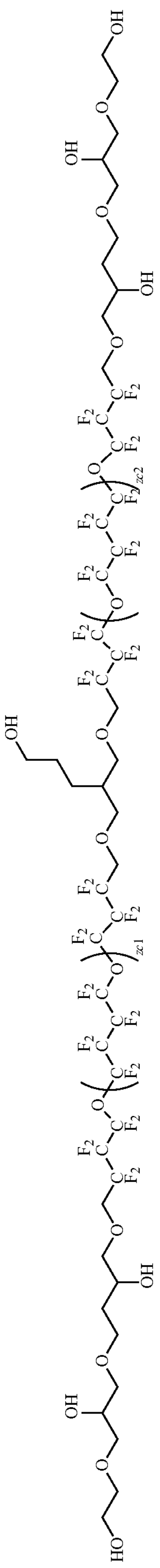
(D)
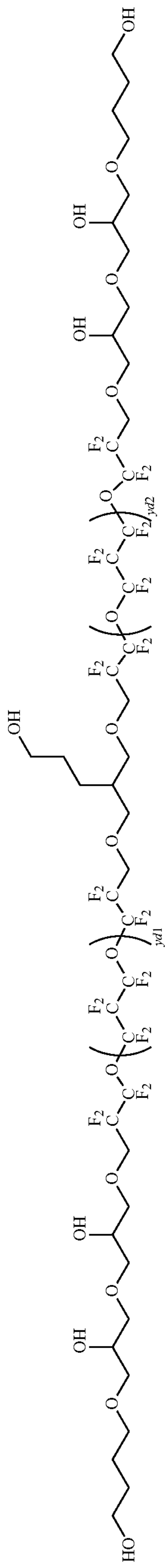

(in Formula (C), zc1 and zc2 indicate average degrees of polymerization and each independently are real numbers of 1 to 20).

(in Formula (D), yd1 and yd2 indicate average degrees of polymerization and each independently are real numbers of 1 to 20).

(E)
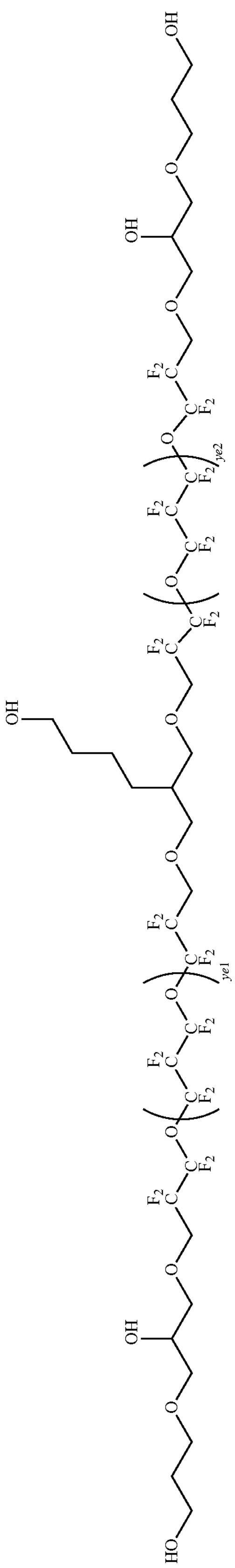
(F)
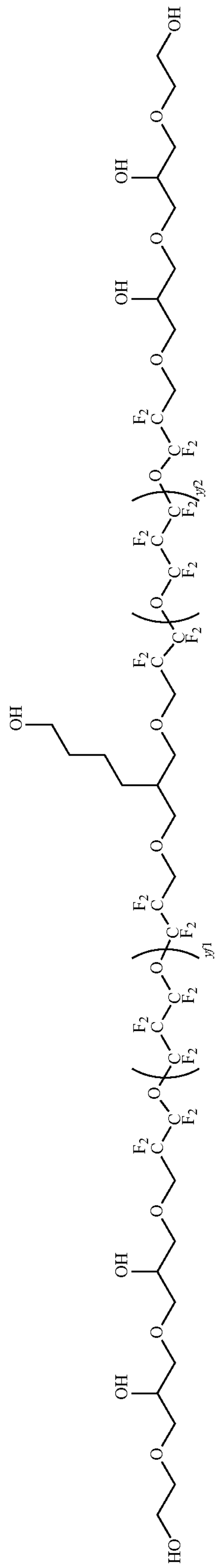

(in Formula (E), ye1 and ye2 indicate average degrees of polymerization and each independently are real numbers of 1 to 20).

(in Formula (F), yf1 and yf2 indicate average degrees of polymerization and each independently are real numbers of 1 to 20).

(G)
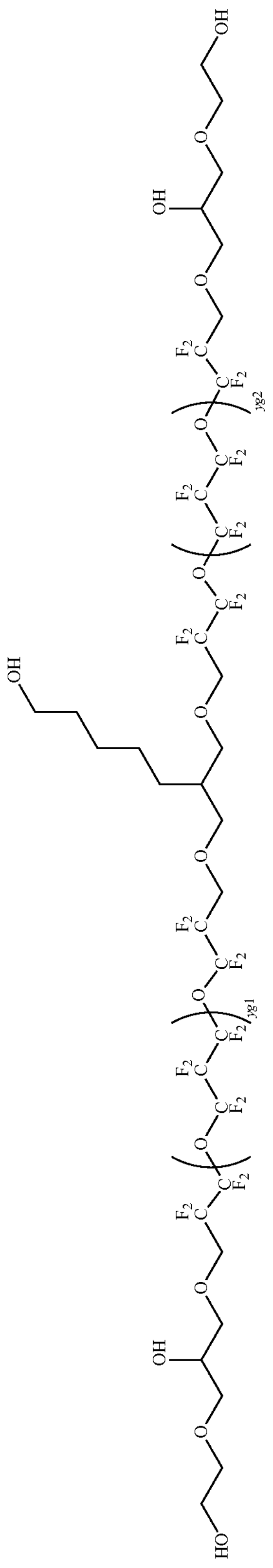
(H)
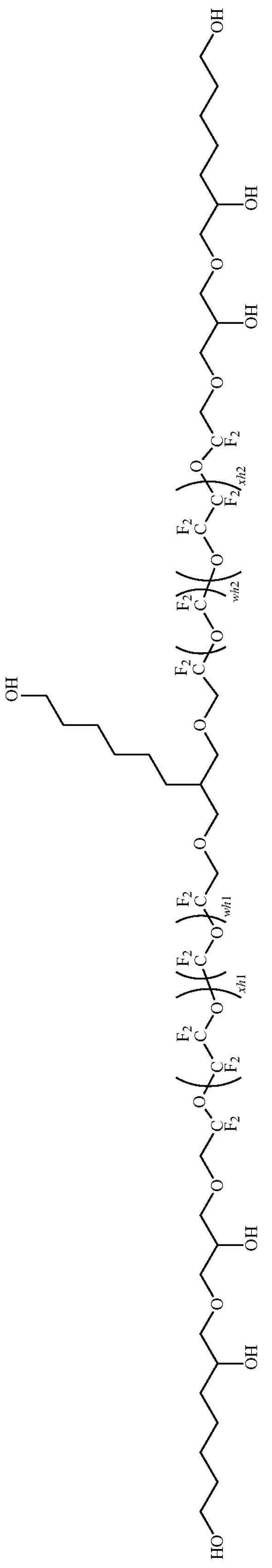

(in Formula (G), yg1 and yg2 indicate average degrees of polymerization, and each independently are real numbers of 1 to 20).

(in Formula (H), xh1, xh2, wh1, and wh2 indicate average degrees of polymerization and each independently are real numbers of 1 to 20).

(I)
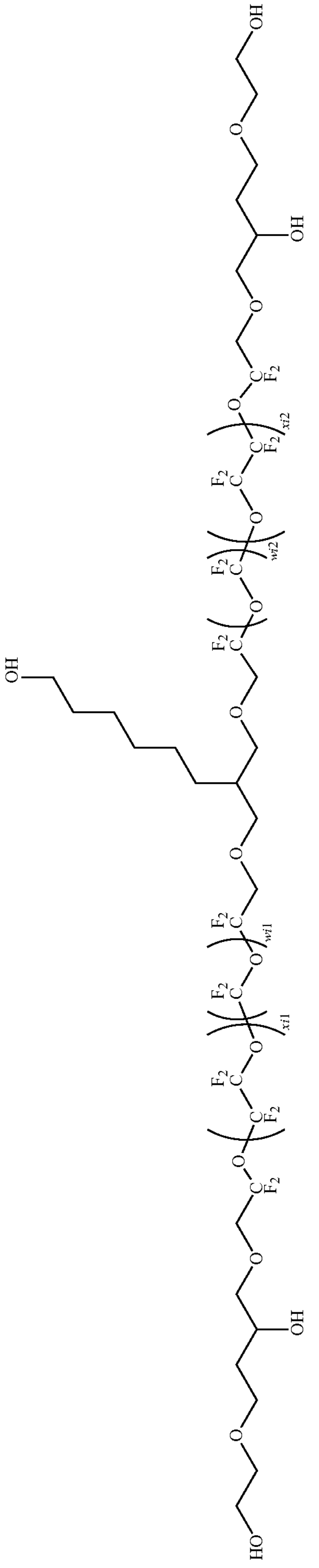
(J)
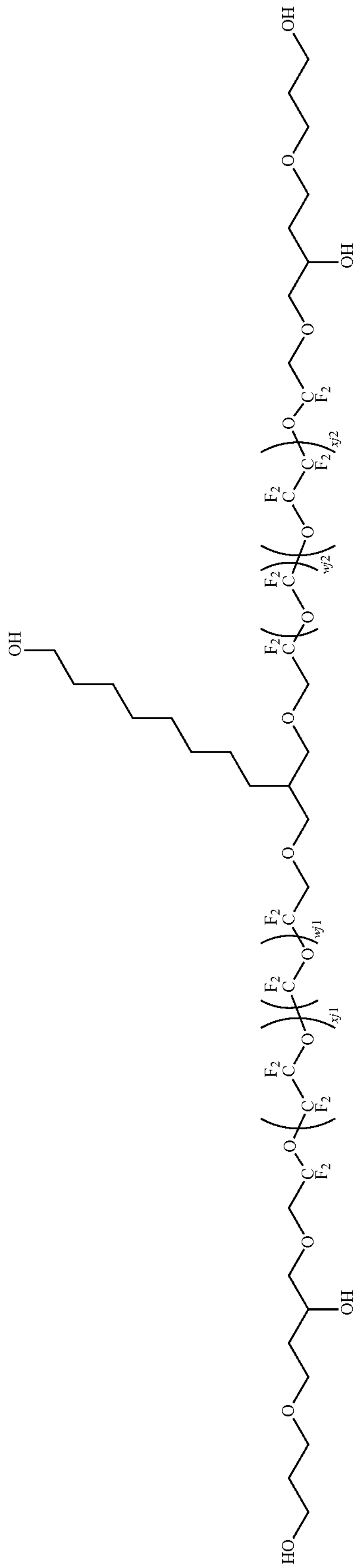

(in Formula (I), xi1, xi2, wi1, and wi2 indicate average degrees of polymerization, and each independently are real numbers of 1 to 20).

(in Formula (J), xj1, xj2, wj1, and wj2 indicate average degrees of polymerization, and each independently are real numbers of 1 to 20).

(O)

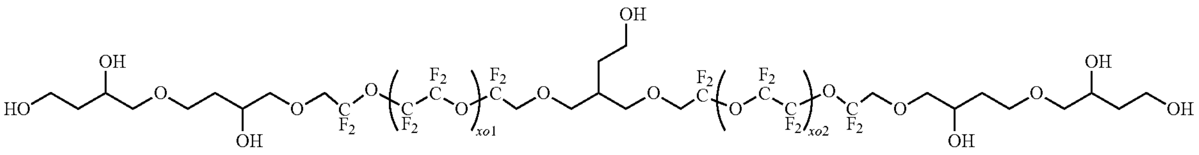

(in Formula (O), xo1 and xo2 indicate average degrees of polymerization, and each independently are real numbers of 1 to 20).

When the compound represented by Formula (1) is any of the compounds represented by Formulae (A) to (J), and (O), this is preferable because a raw material is easily available and it is possible to form a lubricating layer that can increase chemical substance resistance of the magnetic recording medium even if the thickness is thin.

The number-average molecular weight (Mn) of the fluorine-containing ether compound of the present embodiment is preferably in a range of 500 to 10,000, more preferably in a range of 500 to 5,000, and particularly preferably in a range of 1,000 to 3,000. When the number-average molecular weight is 500 or more, the lubricant containing the fluorine-containing ether compound of the present embodiment is less likely to evaporate and it is possible to prevent the lubricant from evaporating and transferring to a magnetic head. In addition, when the number-average molecular weight is 10,000 or less, the viscosity of the fluorine-containing ether compound is appropriate, and when a lubricant containing the compound is applied, a thin lubricating layer can be easily formed. The number-average molecular weight is more preferably 5,000 or less so that the compound has a viscosity at which handling is easy when applied to a lubricant.

The number-average molecular weight (Mn) of the fluorine-containing ether compound is a value measured through $^1$H-NMR and $^9$F-NMR using AVANCE 111 400 (commercially available from Bruker BioSpin). In the measurement of nuclear magnetic resonance (NMR), a sample is diluted with a single solvent such as hexafluorobenzene, d-acetone, and d-tetrahydrofuran or a mixed solvent, and used for measurement. The standard for $^{19}$F-NMR chemical shift is −164.7 ppm for the peak of hexafluorobenzene. The standard for $^1$H-NMR chemical shift is 2.2 ppm for the peak of acetone.

"Production Method"

A method of producing a fluorine-containing ether compound of the present embodiment is not particularly limited, and a conventionally known production method can be used for production. The fluorine-containing ether compound of the present embodiment can be produced using, for example, the following production method.

(First Production Method)

When a compound in which $R^1$ and $R^5$ are the same and two PFPE chains represented by $R^2$ and $R^4$ are the same is produced, the following production method can be used.

First, a fluorine-based compound in which a hydroxy methyl group (—$CH_2OH$) is disposed at both terminals of the perfluoropolyether chain corresponding to $R^2$(=$R^4$) in Formula (1) is prepared. Next, a hydroxyl group of a hydroxy methyl group disposed at one terminal of the fluorine-based compound is reacted with an epoxy compound having a group composed of $R^1$(=$R^5$) in Formula (1) (first reaction). When the first reaction is performed, an intermediate compound 1 having a group corresponding to $R^1$(=$R^5$) at one terminal of the perfluoropolyether chain corresponding to $R^2$(=$R^4$) is obtained.

The epoxy compound having a group composed of $R^1$(=$R^5$) may be reacted with the fluorine-based compound after protecting its hydroxyl group using an appropriate protecting group.

When the fluorine-containing ether compound of the present embodiment is produced, the epoxy compound used in the first reaction can be synthesized by the following method. For example, it can be synthesized by reacting an alcohol having a structure corresponding to a group composed of $R^1$ (or $R^5$) of the fluorine-containing ether compound to be produced with a compound having an epoxy group. As the compound having an epoxy group, one selected from among epichlorohydrin, epibromohydrin, 2-bromoethyloxirane, and allyl glycidyl ether can be used. The epoxy compound may be synthesized by a method of oxidizing an unsaturated bond, and a commercial product may be purchased and used.

Then, the hydroxyl group of the hydroxy methyl group disposed at one terminal of the intermediate compound 1 obtained in the first reaction and two halogen groups represented by X in the compound represented by the following Formula (10) are subjected to a nucleophilic substitution reaction (second reaction). In Formula (10), X is any of a chloro group, a bromo group, and an iodo group.

When the second reaction is performed, an intermediate compound 2 in which a group corresponding to $R^3$ in Formula (1) is bonded to a carbon atom disposed in the center of the chain structure, and the carbon atom forms a double bond with the carbon atom in the group corresponding to $R^3$, is obtained. In the intermediate compound 2, the carbon atom in the chain structure to which a group corresponding to $R^3$ is bonded is bonded to two perfluoropolyether chains corresponding to $R^2$(=$R^4$) via a linking group. A group corresponding to $R^1$ is bonded to the terminal of the perfluoropolyether chain corresponding to $R^2$ contained in the intermediate compound 2 via a methylene group. In addition, a group corresponding to $R^5$ is bonded to the terminal of the perfluoropolyether chain corresponding to $R^4$ via a methylene group.

The compound represented by Formula (10) used in the second reaction when the fluorine-containing ether compound of the present embodiment is produced can be synthesized by the following method. As the compound represented by Formula (10), one having a group corresponding to $R^3$ in the fluorine-containing ether compound represented by Formula (1) as a target product is produced. Specifically, one in which a-1 in the compound represented by Formula

(10) is a numerical value that is 1 smaller than a in Formula (2), which is $R^3$ in the fluorine-containing ether compound represented by Formula (1) as a target product, is produced.

In order to produce the compound represented by Formula (10), first, a compound represented by the following Formula (11) is synthesized according to a Knoevenagel condensation reaction between a carbonyl compound having a structure corresponding to $R^3$ and a malonic ester. In the carbonyl compound used when the compound represented by Formula (11) is produced, the hydroxyl group in the structure corresponding to $R^3$ in Formula (1) is preferably protected with a protecting group such as a tetrahydropyranyl (THP) group before it is reacted with a malonic ester.

Next, the ester of the compound represented by Formula (11) is reduced to synthesize a compound represented by the following Formula (12).

Then, the hydroxyl group of the compound represented by Formula (12) is halogenated according to an Appel reaction. Halogenation may be any of chlorination, bromination, and iodination.

Through the above processes, a compound represented by Formula (10) is obtained.

(10)

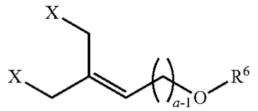

(11)

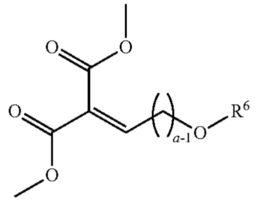

(12)

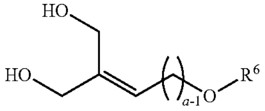

(in Formula (10), X is any of a chloro group, a bromo group, and an iodo group. $R^6$ is a protecting group; and a-1 is a numerical value that is 1 smaller than a in Formula (2), which is $R^3$ in the fluorine-containing ether compound represented by Formula (1)). (in Formula (11), $R^6$ is a protecting group; and a-1 is a numerical value that is 1 smaller than a in Formula (2), which is $R^3$ in the fluorine-containing ether compound represented by Formula (1)) (in Formula (12), $R^6$ is a protecting group; and a-1 is a numerical value that is 1 smaller than a in Formula (2), which is $R^3$ in the fluorine-containing ether compound represented by Formula (1)).

Then, the double bond in the intermediate compound 2 obtained according to the second reaction is converted into a saturated bond according to a catalytic hydrogenation reaction (third reaction).

When the above process is performed, it is possible to produce a compound in which, in Formula (1), $R^1$ and $R^5$ are the same, and two PFPE chains represented by $R^2$ and $R^4$ are the same.

(Second Production Method)

When a compound in which, in Formula (1), $R^1$ and $R^5$ are different, and two PFPE chains represented by $R^2$ and $R^4$ are the same is produced, the following production method can be used. With respect to the second production method, only methods different from the first production method will be described below, and the same methods as in the first production method will not be described and explanation thereof is omitted.

In the second production method, in the first reaction, an intermediate compound 1a having a group corresponding to $R^1$ and an intermediate compound 1b having a group corresponding to $R^5$ are each synthesized.

Then, an excess amount of the compound represented by Formula (10) is reacted with the intermediate compound 1a obtained according to the first reaction, and by-products are additionally removed through silica gel column chromatography to obtain an intermediate compound 2a. Subsequently, the intermediate compound 2a and the intermediate compound 1b are reacted to obtain an intermediate compound 2ab (second reaction).

Then, the double bond in the intermediate compound 2ab obtained according to the second reaction is converted into a saturated bond according to a catalytic hydrogenation reaction (third reaction).

When the above process is performed, it is possible to produce a compound in which, in Formula (1), $R^1$ and $R^5$ are different and two PFPE chains represented by $R^2$ and $R^4$ are the same.

(Third Production Method)

When a compound in which, in Formula (1), $R^1$ and $R^5$ are different, and $R^2$ and $R^4$ are different is produced, the following production method can be used. With respect to the third production method, only methods different from the first production method will be described below, and the same methods as in the first production method will not be described and explanation thereof is omitted.

In the third production method, in the first reaction, the hydroxyl group of the hydroxy methyl group disposed at one terminal of the fluorine-based compound having a perfluoropolyether chain corresponding to $R^2$ is reacted with an epoxy compound having a group composed of $R^1$ to synthesize an intermediate compound 1c. In addition, the hydroxyl group of the hydroxy methyl group disposed at one terminal of the fluorine-based compound having a perfluoropolyether chain corresponding to $R^4$ is reacted with an epoxy compound having a group composed of $R^5$ to synthesize an intermediate compound 1d.

Then, an excess amount of the compound represented by Formula (10) is reacted with the intermediate compound 1c obtained according to the first reaction, and by-products are additionally removed through silica gel column chromatography to obtain an intermediate compound 2c. Subsequently, the intermediate compound 2c and the intermediate compound 1d are reacted to obtain an intermediate compound 2cd (second reaction).

Then, the double bond in the intermediate compound 2cd obtained according to the second reaction is converted into a saturated bond according to a catalytic hydrogenation reaction (third reaction).

When the above process is performed, it is possible to produce a compound in which, in Formula (1), $R^1$ and $R^5$ are different and $R^2$ and $R^4$ are different.

Here, the function of the lubricating layer formed on the protective layer using the lubricant containing the fluorine-containing ether compound of the present embodiment will be described.

Since the fluorine-containing ether compound of the present embodiment is the compound represented by Formula (1), a lubricating layer containing the compound can increase chemical substance resistance of the magnetic recording medium. This effect is based on the synergistic effect of the lubricating layer formed on the protective layer using the lubricant containing the fluorine-containing ether compound of the present embodiment, having excellent adhesion to the protective layer and an appropriate surface energy, and being formed in a uniform coating state on the protective layer.

More specifically, the lubricating layer formed on the protective layer is brought into close contact with the protective layer by the hydroxyl group (—OH) of $R^3$ in the fluorine-containing ether compound represented by Formula (1) and two or three hydroxyl groups contained in each of $R^1$ and $R^5$. Moreover, since the number of hydroxyl groups contained in $R^1$ and $R^5$ is 3 or less, compared to when the number of hydroxyl groups is more than 3, the surface energy of the fluorine-containing ether compound is lower, and the surface energy of the fluorine-containing ether compound is appropriate. Accordingly, the lubricating layer containing the fluorine-containing ether compound represented by Formula (1) makes it difficult for chemical substances to adhere and can prevent chemical substance contamination of the magnetic recording medium.

In addition, in the fluorine-containing ether compound represented by Formula (1), PFPE chains represented by $R^2$ and $R^4$ are disposed between the hydroxyl group contained in $R^3$ and the terminal groups represented by $R^1$ and $R^5$. Therefore, the distance between the hydroxyl group contained in $R^3$ and the hydroxyl group of the terminal groups represented by $R^1$ and $R^5$ is appropriate. As a result, the hydroxyl group contained in $R^3$ is unlikely to aggregate with the hydroxyl group of the terminal groups represented by $R^1$ and $R^5$ and is brought into close contact with the protective layer. Therefore, the fluorine-containing ether compound represented by Formula (1) easily wets and spreads on the protective layer and a lubricating layer containing the compound is easily formed in a uniform coating state. Since the lubricating layer formed in a uniform coating state has a high coverage, it can increase chemical substance resistance of the magnetic recording medium.

In addition, the fluorine-containing ether compound represented by Formula (1) has PFPE chains represented by $R^2$ and $R^4$. The PFPE chains represented by $R^2$ and $R^4$ contained in the lubricating layer cover the surface of the protective layer and impart chemical substance resistance to the lubricating layer due to a low surface energy. In addition, in the fluorine-containing ether compound represented by Formula (1), since $R^3$ has a structure represented by Formula (2), the distance between the hydroxyl group contained in $R^3$ and the PFPE chains represented by $R^2$ and $R^4$ is appropriate. As a result, the hydroxyl group contained in $R^3$ approaches the protective layer without being inhibited by the PFPE chains represented by $R^2$ and $R^4$. Therefore, a lubricating layer exhibiting excellent adhesion to the protective layer is obtained.

[Lubricant for Magnetic Recording Medium]

A lubricant for a magnetic recording medium of the present embodiment contains a fluorine-containing ether compound represented by Formula (1).

The lubricant of the present embodiment can be used by being mixed with a known material used as a material for the lubricant as necessary as long as the characteristics due to the inclusion of the fluorine-containing ether compound represented by Formula (1) are not impaired.

Specific examples of known materials include, for example, FOMBLIN (registered trademark) ZDIAC, FOMBLIN ZDEAL, and FOMBLIN AM-2001 (all commercially available from Solvay Solexis), and Moresco A20H (commercially available from Moresco). A known material used in combination with the lubricant of the present embodiment preferably has a number-average molecular weight of 500 to 10,000.

When the lubricant of the present embodiment contains a material other than the fluorine-containing ether compound represented by Formula (1), the content of the fluorine-containing ether compound represented by Formula (1) in the lubricant of the present embodiment is preferably 50 mass % or more and more preferably 70 mass % or more. The content of the fluorine-containing ether compound represented by Formula (1) may be 80 mass % or more or 90 mass % or more.

Since the lubricant of the present embodiment contains the fluorine-containing ether compound represented by Formula (1), it is possible to form a lubricating layer which has excellent adhesion to the protective layer, can cover the surface of the protective layer with a high coverage even if the thickness is thin, and has a favorable coverage. Therefore, according to the lubricant of the present embodiment, it is possible to obtain a lubricating layer that can increase chemical substance resistance of the magnetic recording medium even if the thickness is thin.

[Magnetic Recording Medium]

In a magnetic recording medium of the present embodiment, at least a magnetic layer, a protective layer, and a lubricating layer are sequentially provided on a substrate.

In the magnetic recording medium of the present embodiment, as necessary, one, two or more underlayers can be provided between the substrate and the magnetic layer. In addition, an adhesive layer and/or a soft magnetic layer can be provided between the underlayer and the substrate.

The FIGURE is a schematic cross-sectional view showing a magnetic recording medium according to one embodiment of the present invention.

A magnetic recording medium 10 of the present embodiment has a structure in which an adhesive layer 12, a soft magnetic layer 13, a first underlayer 14, a second underlayer 15, a magnetic layer 16, a protective layer 17, and a lubricating layer 18 are sequentially provided on a substrate 11.

"Substrate"

As the substrate 11, for example, a non-magnetic substrate in which a film made of NiP or a NiP alloy is formed on a base made of a metal or an alloy material such as Al or an Al alloy can be used.

In addition, as the substrate 11, a non-magnetic substrate made of a non-metal material such as glass, a ceramic, silicon, silicon carbide, carbon, and a resin may be used, or a non-magnetic substrate in which a film of NiP or a NiP alloy is formed on a base made of the non-metal material may be used.

"Adhesive Layer"

The adhesive layer 12 prevents the progress of corrosion of the substrate 11 that occurs when the substrate 11 and the soft magnetic layer 13 which is provided on the adhesive layer 12 are disposed in contact with each other.

The material of the adhesive layer 12 can be appropriately selected from among, for example, Cr, a Cr alloy, Ti, a Ti alloy, CrTi, NiAl, and an AlRu alloy. The adhesive layer 12 can be formed by, for example, a sputtering method.

"Soft Magnetic Layer"

The soft magnetic layer 13 preferably has a structure in which a first soft magnetic film, an intermediate layer made of a Ru film, and a second soft magnetic film are sequentially laminated. That is, the soft magnetic layer 13 preferably has a structure in which an intermediate layer made of a Ru film is interposed between two soft magnetic film layers, and thus the soft magnetic films above and below the intermediate layer are bonded by anti-ferromagnetic coupling (AFC).

Examples of materials of the first soft magnetic film and the second soft magnetic film include a CoZrTa alloy and a CoFe alloy.

It is preferable to add any of Zr, Ta, and Nb to the CoFe alloy used for the first soft magnetic film and the second soft magnetic film. Thereby, the amorphization of the first soft magnetic film and the second soft magnetic film is promoted. As a result, it is possible to improve the orientation of the first underlayer (seed layer) and it is possible to reduce the floating height of the magnetic head.

The soft magnetic layer 13 can be formed by, for example, a sputtering method.

"First Underlayer"

The first underlayer 14 is a layer that controls the orientation and the crystal size of the second underlayer 15 and the magnetic layer 16 provided thereon.

Examples of the first underlayer 14 include a Cr layer, a Ta layer, a Ru layer, and a CrMo alloy layer, a CoW alloy layer, a CrW alloy layer, a CrV alloy layer, and a CrTi alloy layer.

The first underlayer 14 can be formed by, for example, a sputtering method.

"Second Underlayer"

The second underlayer 15 is a layer that controls the orientation of the magnetic layer 16 such that it becomes favorable. The second underlayer 15 is preferably a layer made of Ru or a Ru alloy.

The second underlayer 15 may be single layer or may be composed of a plurality of layers. When the second underlayer 15 is composed of a plurality of layers, all of the layers may be composed of the same material, or at least one layer may be composed of a different material.

The second underlayer 15 can be formed by, for example, a sputtering method.

"Magnetic Layer"

The magnetic layer 16 is made of a magnetic film in which the axis of easy magnetization is in a direction perpendicular or horizontal to the surface of the substrate. The magnetic layer 16 is a layer containing Co and Pt. The magnetic layer 16 may be a layer containing an oxide, Cr, B, Cu, Ta, Zr or the like in order to improve SNR characteristics.

Examples of oxides contained in the magnetic layer 16 include $SiO_2$, SiO, $Cr_2O_3$, CoO, $Ta_2O_3$, and $TiO_2$.

The magnetic layer 16 may be composed of a single layer or may be composed of a plurality of magnetic layers made of materials with different compositions. For example, when the magnetic layer 16 is composed of three layers including a first magnetic layer, a second magnetic layer, and a third magnetic layer sequentially laminated from below, the first magnetic layer preferably has a granular structure made of a material containing Co, Cr, and Pt, and further containing an oxide. As the oxide contained in the first magnetic layer, for example, it is preferable to use an oxide of Cr, Si, Ta, Al, Ti, Mg, Co or the like. Among these, particularly, $TiO_2$, $Cr_2O_3$, $SiO_2$ or the like can be preferably used. In addition, the first magnetic layer is preferably made of a composite oxide in which two or more oxides are added. Among these, particularly, $Cr_2O_3$—$SiO_2$, $Cr_2O_3$—$TiO_2$, $SiO_2$—$TiO_2$ or the like can be preferably used.

The first magnetic layer can contain one or more elements selected from the group consisting of B, Ta, Mo, Cu, Nd, W, Nb, Sm, Tb, Ru, and Re in addition to Co, Cr, Pt, and an oxide.

For the second magnetic layer, the same material as for the first magnetic layer can be used. The second magnetic layer preferably has a granular structure.

The third magnetic layer preferably has a non-granular structure made of a material containing Co, Cr, and Pt, and not containing an oxide. The third magnetic layer can contain one or more elements selected from the group consisting of B, Ta, Mo, Cu, Nd, W, Nb, Sm, Tb, Ru, Re, and Mn in addition to Co, Cr, and Pt.

When the magnetic layer 16 is formed of a plurality of magnetic layers, it is preferable to provide a non-magnetic layer between adjacent magnetic layers. When the magnetic layer 16 is composed of three layers including a first magnetic layer, a second magnetic layer, and a third magnetic layer, it is preferable to provide a non-magnetic layer between the first magnetic layer and the second magnetic layer, and between the second magnetic layer and the third magnetic layer.

For the non-magnetic layer provided between adjacent magnetic layers of the magnetic layer 16, for example, Ru, a Ru alloy, a CoCr alloy, a CoCrX1 alloy (X1 is one, two or more elements selected from among Pt, Ta, Zr, Re, Ru, Cu, Nb, Ni, Mn, Ge, Si, O, N, W, Mo, Ti, V, and B), or the like can be preferably used.

For the non-magnetic layer provided between adjacent magnetic layers of the magnetic layer 16, it is preferable to use an alloy material containing an oxide, a metal nitride, or a metal carbide. Specifically, as the oxide, for example, $SiO_2$, $Al_2O_3$, $Ta_2O_5$, $Cr_2O_3$, MgO, $Y_2O_3$, $TiO_2$ or the like can be used. As the metal nitride, for example, AlN, $Si_3N_4$, TaN, CrN or the like can be used. As the metal carbide, for example, TaC, BC, SiC or the like can be used.

The non-magnetic layer can be formed by, for example, a sputtering method.

The magnetic layer 16 is preferably a magnetic layer for perpendicular magnetic recording in which the axis of easy magnetization is in a direction perpendicular to the surface of the substrate in order to realize a higher recording density. The magnetic layer 16 may be a magnetic layer for in-plane magnetic recording. The magnetic layer 16 may be formed by any conventionally known method such as a deposition method, an ion beam sputtering method, and a magnetron sputtering method. The magnetic layer 16 is generally formed by a sputtering method.

"Protective Layer"

The protective layer 17 protects the magnetic layer 16. The protective layer 17 may be composed of one layer or may be composed of a plurality of layers. Examples of materials of the protective layer 17 include carbon, carbon containing nitrogen, and silicon carbide.

As the protective layer 17, a carbon-based protective layer can be preferably used, and an amorphous carbon protective layer is particularly preferable. When the protective layer 17 is a carbon-based protective layer, this is preferable because the interaction with the hydroxyl group contained in the fluorine-containing ether compound in the lubricating layer 18 is further improved.

The adhesive force between the carbon-based protective layer and the lubricating layer 18 can be controlled by forming the carbon-based protective layer with hydrogenated carbon and/or nitrogenized carbon and adjusting the hydrogen content and/or the nitrogen content in the carbon-based protective layer. The hydrogen content in the carbon-based protective layer measured by a hydrogen forward scattering method (HFS) is preferably 3 to 20 atom %. In addition, the nitrogen content in the carbon-based protective layer measured through X-ray photoelectron spectroscopy (XPS) is preferably 4 to 15 atom %.

Hydrogen and/or nitrogen contained in the carbon-based protective layer need not be uniformly contained throughout the entire carbon-based protective layer. For example, the carbon-based protective layer is preferably formed as a composition gradient layer in which nitrogen is contained in the protective layer 17 on the side of the lubricating layer 18 and hydrogen is contained in the protective layer 17 on the side of the magnetic layer 16. In this case, the adhesive force between the carbon-based protective layer and the magnetic layer 16 and the lubricating layer 18 is further improved.

The film thickness of the protective layer 17 may be 1 nm to 7 nm. When the film thickness of the protective layer 17 is 1 nm or more, the performance of the protective layer 17 can be sufficiently obtained. The film thickness of the protective layer 17 is preferably 7 nm or less, from the viewpoint of film thinning of the protective layer 17.

As a film forming method for the protective layer 17, a sputtering method using a target material containing carbon, a chemical vapor deposition (CVD) method using a hydrocarbon raw material such as ethylene or toluene, an ion beam deposition (IBD) method or the like can be used.

When a carbon-based protective layer is formed as the protective layer 17, for example, a film can be formed by a DC magnetron sputtering method. In particular, when a carbon-based protective layer is formed as the protective layer 17, it is preferable to form an amorphous carbon protective layer by a plasma CVD method. The amorphous carbon protective layer formed by the plasma CVD method has uniform surfaces and low roughness.

"Lubricating Layer"

The lubricating layer 18 prevents contamination of the magnetic recording medium 10. In addition, the lubricating layer 18 reduces a frictional force of a magnetic head of a magnetic recording/reproducing device, which slides on the magnetic recording medium 10, and improves the durability of the magnetic recording medium 10.

As shown in the FIGURE, the lubricating layer 18 is formed on and in contact with the protective layer 17. The lubricating layer 18 contains the above fluorine-containing ether compound.

When the protective layer 17 disposed below the lubricating layer 18 is a carbon-based protective layer, particularly, the lubricating layer 18 is bonded to the protective layer 17 with a high bonding force. As a result, even if the thickness of the lubricating layer 18 is thin, it is easy to obtain the magnetic recording medium 10 in which the surface of the protective layer 17 is covered with a high coverage, and it is possible to effectively prevent contamination of the surface of the magnetic recording medium 10.

The average film thickness of the lubricating layer 18 is preferably 0.5 nm (5 Å) to 2.0 nm (20 Å), and more preferably 0.5 nm (5 Å) to 1.0 nm (10 Å). When the average film thickness of the lubricating layer 18 is 0.5 nm or more, the lubricating layer 18 is formed with a uniform film thickness without forming an island shape or a mesh shape. Therefore, the lubricating layer 18 can cover the surface of the protective layer 17 with a high coverage. In addition, when the average film thickness of the lubricating layer 18 is 2.0 nm or less, the lubricating layer 18 can be sufficiently thinned, and the floating height of the magnetic head can be sufficiently reduced.

When the surface of the protective layer 17 is not sufficiently covered with the lubricating layer 18 with a high coverage, environmental substances adsorbed on the surface of the magnetic recording medium 10 pass through voids of the lubricating layer 18 and enter a layer below the lubricating layer 18. The environmental substances that have entered the layer below the lubricating layer 18 are adsorbed and bonded to the protective layer 17 and produce contamination substances. Thus, during magnetic recording/reproducing, the contamination substances (aggregated components) adhere (transfers) to a magnetic head as a smear, the magnetic head may be damaged, and magnetic recording/reproducing characteristics of the magnetic recording/reproducing device may deteriorate.

Examples of environmental substances that generate contamination substances include siloxane compounds (cyclic siloxanes and linear siloxanes), ionic impurities, hydrocarbon with a relatively high molecular weight such as octacosan, and plasticizers such as dioctyl phthalate. Examples of metal ions contained in ionic impurities include sodium ions and potassium ions. Examples of inorganic ions contained in ionic impurities include chlorine ions, bromide ions, nitrate ions, sulfate ions, and ammonium ions. Examples of organic ions contained in ionic impurities include oxalate ions and formate ions.

"Method of Forming Lubricating Layer"

Examples of a method of forming the lubricating layer 18 include a method in which a magnetic recording medium is prepared during production in which respective layers up to the protective layer 17 are formed on the substrate 11, and a solution for forming a lubricating layer is applied onto the protective layer 17 and dried.

The solution for forming a lubricating layer can be obtained by dispersing and dissolving the lubricant for a magnetic recording medium of the embodiment described above in a solvent as necessary, and adjusting the viscosity and concentration to be suitable for application methods.

Examples of solvents used for the solution for forming a lubricating layer include fluorine-based solvents such as Vertrel (registered trademark) XF (product name, commercially available from Du Pont-Mitsui Fluorochemicals Co., Ltd.).

The method of applying the solution for forming a lubricating layer is not particularly limited, and examples thereof include a spin coating method, a spraying method, a paper coating method, and a dipping method.

When the dipping method is used, for example, the following method can be used. First, the substrate 11 in which respective layers up to the protective layer 17 are formed is immersed in the solution for forming a lubricating layer contained in an immersion vessel of a dip coating device. Next, the substrate 11 is lifted from the immersion vessel at a predetermined speed. Accordingly, the solution for forming a lubricating layer is applied to the surface of the protective layer 17 of the substrate 11.

When the dipping method is used, the solution for forming a lubricating layer can be uniformly applied to the surface of the protective layer 17, and the lubricating layer 18 with a uniform film thickness can be formed on the protective layer 17.

In the present embodiment, it is preferable to heat the substrate 11 in which the lubricating layer 18 is formed. When the heat treatment is performed, the adhesion between the lubricating layer 18 and the protective layer 17 is improved, and the adhesive force between the lubricating layer 18 and the protective layer 17 is improved.

The heat treatment temperature is preferably 100 to 180° C. When the heat treatment temperature is 100° C. or higher, an effect of improving the adhesion between the lubricating layer 18 and the protective layer 17 is sufficiently obtained. In addition, when the heat treatment temperature is 180° C. or lower, it is possible to prevent the thermal decomposition of the lubricating layer 18. The heat treatment time is preferably 10 to 120 minutes.

In the magnetic recording medium 10 of the present embodiment, at least the magnetic layer 16, the protective layer 17, and the lubricating layer 18 are sequentially provided on the substrate 11. In the magnetic recording medium 10 of the present embodiment, the lubricating layer 18 containing the above fluorine-containing ether compound is formed on and in contact with the protective layer 17. The lubricating layer 18 has excellent adhesion to the protective layer 17 and an appropriate surface energy, and can cover the surface of the protective layer 17 with a high coverage in a uniform coating state even if the thickness is thin and has a favorable coverage. Therefore, in the magnetic recording medium 10 of the present embodiment, environmental substances that generate contamination substances such as ionic impurities are prevented from entering through voids of the lubricating layer 18. In addition, the lubricating layer 18 in the magnetic recording medium 10 of the present embodiment is less likely to generate foreign matter (smear) and can reduce the occurrence of pickup. Therefore, the magnetic recording medium 10 of the present embodiment has a small amount of contamination substances present on the surface, and has excellent chemical substance resistance, and favorable reliability and durability.

EXAMPLES

Hereinafter, the present invention will be described in more detail with reference to examples and comparative examples. Here, the present invention is not limited only to the following examples.

Example 1

The compound represented by Formula (A) shown above was produced by the following method.

20 g of a compound (a number-average molecular weight of 1,000 and a molecular weight distribution of 1.1) represented by $HOCH_2CF_2O(CF_2CF_2O)_xCF_2CH_2OH$ (in the formula, x indicating the average degree of polymerization is 7.1), 3.00 g (a molecular weight of 250.29, 12.0 mmol) of a compound represented by the following Formula (13) and 20 mL of t-butanol were put into a 200 mL eggplant flask under a nitrogen gas atmosphere, and the mixture was stirred at room temperature until it became uniform. 0.67 g (a molecular weight of 112.21, 6.0 mmol) of potassium tert-butoxide was additionally added to this uniform solution and the mixture was stirred and reacted at 70° C. for 16 hours.

The reaction product obtained after the reaction was cooled to 25° C., and transferred into a separatory funnel containing 100 mL of water, and extracted three times with 100 mL of ethyl acetate. The organic layer was washed with water and dehydrated with anhydrous sodium sulfate. After the drying agent was filtered off, the filtrate was concentrated, and the residue was purified through silica gel column chromatography to obtain 10.00 g (a molecular weight of 1,250.29, 8.0 mmol) of a compound represented by the following Formula (14) as an intermediate.

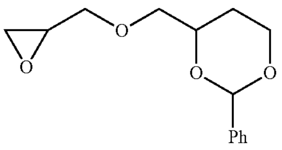
(13)

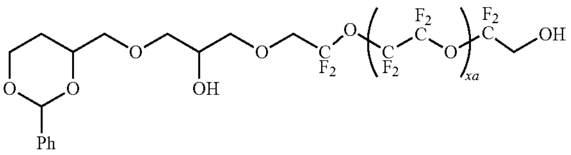
(14)

(in Formula (13), Ph is a phenyl group).

(in Formula (14), xa, which indicates the average degree of polymerization, is 7.1, and Ph is a phenyl group).

Here, the compound represented by Formula (13) was synthesized by the following method.

1,2,4-butanetriol was reacted with benzaldehyde dimethyl acetal to synthesize a compound in which hydroxyl groups bonded to the $2^{nd}$ and $4^{th}$ carbon atoms of 1,2,4-butanetriol were protected. This compound and epibromohydrin were reacted to synthesize a compound represented by Formula (13).

Subsequently, 10.00 g of the compound represented by Formula (14) (a molecular weight of 1,250.29, 8.0 mmol), which is the intermediate obtained above, and 80 mL of N,N-dimethylformamide were put into a 200 mL eggplant flask under a nitrogen gas atmosphere, and the mixture was stirred at room temperature until it became uniform. This uniform solution was cooled to 0° C., 0.33 g of sodium hydride (a purity of 60%, a molecular weight of 24.00, 8.2 mmol) was added, the mixture was stirred for 30 minutes, and 1.31 g of the compound represented by Formula (15) (a molecular weight of 328.04, 4.0 mmol) was then gradually added. The suspension obtained in the above operation was stirred at room temperature for 24 hours.

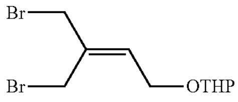
(15)

(in Formula (15), THP is a tetrahydropyranyl group).

After 10 mL of water was gradually added to the reaction solution obtained after the reaction under ice-cooling, the reaction solution was transferred little by little into a separatory funnel containing 100 mL of a saturated saline solution, and extracted three times with 200 mL of a mixed solvent wherein ethyl acetate and hexane were mixed. Each organic layer was washed with 100 mL of a saline solution and dehydrated with anhydrous sodium sulfate. After the drying agent was filtered off, the filtrate was concentrated, and the residue was purified through silica gel column chromatography to obtain 4.27 g of a compound represented by Formula (16) (a molecular weight of 2,666.83, 1.6 mmol) as an intermediate.

(16)

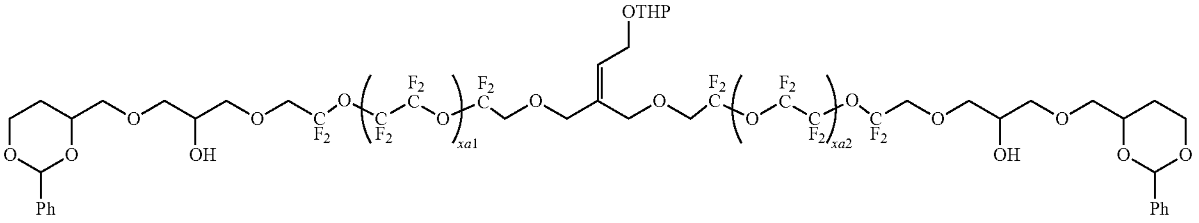

(in Formula (16), xa1 and xa2 indicating the average degree of polymerization are both 7.1; and Ph is a phenyl group, and THP is a tetrahydropyranyl group).

4.27 g (a molecular weight of 2.666.83. 1.6 mmol) of the compound represented by Formula (16), 30 mL of ethanol and 0.10 g of Pd/C (5% Pd) were put into a 200 mL eggplant flask under a nitrogen gas atmosphere. After a hydrogen atmosphere was created in the reaction system, the mixture was stirred at room temperature for 16 hours. After Pd/C was removed by celite filtration, 30 mL of a 5% hydrogen chloride methanol solution was added to the filtrate, and the mixture was stirred at room temperature for 2 hours. The reaction solution was neutralized with 125 mL of a saturated aqueous sodium hydrogen carbonate solution and then extracted three times with 250 mL of ethyl acetate. Each organic layer was washed with 125 mL of a saturated aqueous sodium chloride solution and dehydrated with anhydrous sodium sulfate. After the drying agent was filtered off, the filtrate was concentrated, and the residue was purified through silica gel column chromatography to obtain 3.27 g (a molecular weight of 2,408.53, 1.4 mmol) of the compound (A) (in Formula (A), xa1 and xa2 indicating average degrees of polymerization are both 7.1).

The compound represented by Formula (15) used in the above reaction was synthesized by five-stage reactions including the following first reaction to fifth reaction.

One hydroxyl group of ethylene glycol was protected with a tetrahydropyranyl (THP) group (first reaction). Next, the other hydroxyl group of ethylene glycol was converted into an aldehyde group according to Swern oxidation (second reaction) to obtain an aldehyde compound represented by Formula (17). A compound represented by Formula (18) was obtained by Knoevenagel condensation reaction between the obtained aldehyde compound represented by Formula (17), and dimethyl malonate (third reaction). A compound represented by Formula (19) was obtained by reducing ester of the obtained compound represented by Formula (18) (fourth reaction). Then, a compound represented by Formula (15) was obtained by brominating the hydroxyl group of the compound represented by Formula (19) according to an Appel reaction (fifth reaction).

(17)

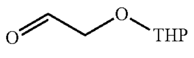

(18)

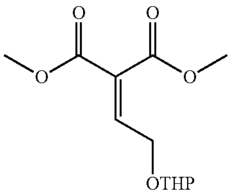

-continued (19)

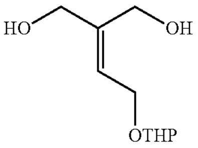

(in Formula (17), THP is a tetrahydropyranyl group).

(in Formula (18), THP is a tetrahydropyranyl group).

(in Formula (19), THP is a tetrahydropyranyl group).

The obtained compound (A) was subjected to $^{1}$H-NMR measurement and $^{19}$F-NMR measurement, and the structure was identified based on the following results.

$^{1}$H-NMR ($CD_3COCD_3$); δ[ppm]=1.5 to 1.9 (7H), 3.4 to 4.3 (41H)

$^{19}$F-NMR($CD_3COCD_3$): δ[ppm]=−77 to −80 (8F), −88 to −91 (56F)

Example 2

The same operation as in Example 1 was performed except that 2.76 g (a molecular weight of 230.30, 12.0 mmol) of the compound represented by the following Formula (20) was used in place of the compound represented by Formula (13). 3.23 g of the compound represented by Formula (B) (in Formula (B), xb1 and xb2 indicating average degrees of polymerization are both 7.1) was obtained.

(20)

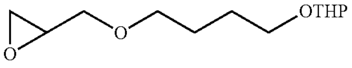

(in Formula (20), THP is a tetrahydropyranyl group).

The compound represented by Formula (20) was synthesized by protecting one hydroxyl group of 1,4-butanediol with a tetrahydropyranyl (THP) group and reacting the other hydroxyl group with epibromohydrin.

The obtained compound (B) was subjected to $^{1}$H-NMR measurement and $^{19}$F-NMR measurement, and the structure was identified based on the following results.

$^{1}$H-NMR ($CD_3COCD_3$); δ[ppm]=1.5 to 1.89 (11H), 3.4 to 4.3 (37H)

$^{19}$F-NMR($CD_3COCD_3$): δ[ppm]=−77 to −80 (8F), −88 to −91 (56F)

Example 3

The same operation as in Example 1 was performed except for the following (i) to (iii).

(i) unlike Example 1, 20 g of a compound (a number-average molecular weight of 1,000, a molecular weight distribution of 1.1) represented by $HOCH_2CF_2CF_2CF_2O(CF_2CF_2CF_2CF_2O)_zCF_2CF_2CF_2CH_2OH$ (in the formula, z indicating the average degree of polymerization is 2.9) was used in place of the compound (a number-average molecular weight of 1,000 and a molecular weight distribution of 1.1) represented by $HOCH_2CF_2O(CF_2CF_2O)_xCF_2CH_2OH$ (in the formula, x indicating the average degree of polymerization is 7.1);

(ii) unlike Example 1, 4.01 g (a molecular weight of 334.41, 12.0 mmol) of a compound represented by the following Formula (21) was used in place of the compound represented by Formula (13);

(iii) unlike Example 1, 1.37 g (a molecular weight of 342.07, 4.0 mmol) of a compound represented by the following Formula (22) was used in place of the compound represented by Formula (15).

As a result, 3.41 g of the compound represented by Formula (C) (in Formula (C), zc1 and zc2 indicating average degrees of polymerization are both 2.9) was obtained.

(21)

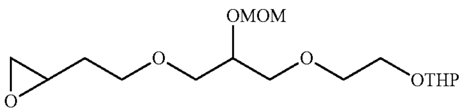

(22)

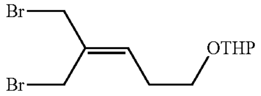

(in Formula (21), THP is a tetrahydropyranyl group, and MOM is a methoxymethyl group).

(in Formula (22), THP is a tetrahydropyranyl group).

The compound represented by Formula (21) was synthesized by the following method.

A compound obtained by oxidizing a compound in which ethylene glycol monoallyl ether was protected using dihydropyran was reacted with a hydroxyl group of 3-buten-1-ol. A secondary hydroxyl group of the obtained compound was protected with a methoxymethyl (MOM) group, and the double bond of the obtained compound was oxidized to synthesize a compound represented by Formula (21).

The compound represented by Formula (22) was synthesized in the same method as in the compound represented by Formula (15) except that 1,3-propanediol was used in place of ethylene glycol as a starting substance.

The obtained compound (C) was subjected to $^1$H-NMR measurement and $^{19}$F-NMR measurement, and the structure was identified based on the following results.

$^1$H-NMR ($CD_3COCD_3$); δ[ppm]=1.5 to 1.9 (9H), 3.4 to 4.3 (49H)

$^{19}$F-NMR($CD_3COCD_3$): δ[ppm]=−83.7 (31F), −120.5 (4F), −122.8 ppm(4F), −125.8 (23F), −127.6 (8F)

Example 4

The same operation as in Example 1 was performed except for the following (i) to (iii).

(i) unlike Example 1, 20 g of a compound (a number-average molecular weight of 1,000 and a molecular weight distribution of 1.1) represented by $HOCH_2CF_2CF_2O(CF_2CF_2CF_2O)_yCF_2CF_2CH_2OH$ (in the formula, y indicating the average degree of polymerization is 4.4) was used in place of the compound (a number-average molecular weight of 1,000 and a molecular weight distribution of 1.1) represented by $HOCH_2CF_2O(CF_2CF_2O)_xCF_2CH_2OH$ (in the formula, x indicating the average degree of polymerization is 7.1);

(ii) unlike Example 1, 4.18 g (a molecular weight of 348.44, 12.0 mmol) of a compound represented by the following Formula (23) was used in place of the compound represented by Formula (13);

(iii) unlike Example 1, 1.37 g (a molecular weight of 342.07, 4.0 mmol) of the compound represented by Formula (22) was used in place of the compound represented by Formula (15).

As a result, 3.45 g of the compound represented by Formula (D) (in Formula (D), yd1 and yd2 indicating the average degree of polymerization are both 4.4) was obtained.

(23)

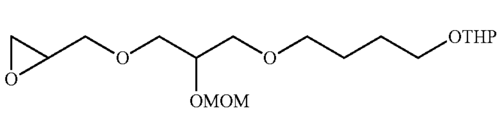

(in Formula (23), THP is a tetrahydropyranyl group, and MOM is a methoxymethyl group).

The compound represented by Formula (23) was synthesized by the following method.

A tert-butyldimethylsilyl (TBS) group as a protecting group was introduced into the primary hydroxyl group of 3-allyloxy-1,2-propanediol, and a methoxymethyl (MOM) group as a protecting group was introduced into the secondary hydroxyl group of the obtained compound. Then, the TBS group was removed from the compound and the produced primary hydroxyl group was reacted with 2-(4-bromobutoxy)tetrahydro-2H-pyran. The double bond of the obtained compound was oxidized. Through the above processes, the compound represented by Formula (23) was obtained.

The obtained compound (D) was subjected to $^1$H-NMR measurement and $^{19}$F-NMR measurement, and the structure was identified based on the following results.

$^1$H-NMR ($CD_3COCD_3$); δ[ppm]=1.5 to 1.9 (13H), 3.4 to 4.3 (49H)

$^{19}$F-NMR($CD_3COCD_3$): δ[ppm]=−84.3 (36F), −86.4 (4F), −124.2 (4F), −130.1 (18F)

Example 5

The same operation as in Example 1 was performed except for the following (i) to (iii).

(i) unlike Example 1, 20 g of a compound (a number-average molecular weight of 1,000 and a molecular weight distribution of 1.1) represented by $HOCH_2CF_2CF_2O(CF_2CF_2CF_2O)_yCF_2CF_2CH_2OH$ (in the formula, y indicating the average degree of polymerization is 4.4) was used in place of the compound (a number-average molecular weight of 1,000 and a molecular weight distribution of 1.1) represented by $HOCH_2CF_2O(CF_2CF_2O)_xCF_2CH_2OH$ (in the formula, x indicating the average degree of polymerization is 7.1);

(ii) unlike Example 1, 2.59 g (a molecular weight of 216.27, 12.0 mmol) of a compound represented by the following Formula (24) was used in place of the compound represented by Formula (13);

(iii) unlike Example 1, 1.42 g (a molecular weight of 356.1, 4.0 mmol) of a compound represented by the following Formula (25) was used in place of the compound represented by Formula (15).

As a result, 3.23 g of the compound represented by Formula (E) (in Formula (E), ye1 and ye2 indicating the average degree of polymerization are both 4.4) was obtained.

(24)

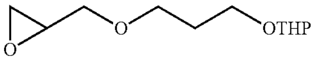

(in Formula (24), THP is a tetrahydropyranyl group).

The compound represented by Formula (24) was synthesized by protecting one hydroxyl group of 1,3-propanediol with a tetrahydropyranyl (THP) group and reacting the other hydroxyl group with epibromohydrin.

(25)

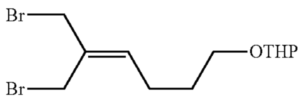

(in Formula (25), THP is a tetrahydropyranyl group).

The compound represented by Formula (25) was synthesized in the same method as in the compound represented by Formula (15) except that 1,4-butanediol was used in place of ethylene glycol as a starting substance.

The obtained compound (E) was subjected to $^1$H-NMR measurement and $^{19}$F-NMR measurement, and the structure was identified based on the following results.

$^1$H-NMR ($CD_3COCD_3$); δ[ppm]=1.5 to 1.9 (11H), 3.4 to 4.3 (37H)

$^{19}$F-NMR($CD_3COCD_3$): δ[ppm]=−84.3 (36F), −86.4 (4F), −124.2 (4F), −130.1 (18F)

Example 6

The same operation as in Example 1 was performed except for the following (i) to (iii).

(i) unlike Example 1, 20 g of a compound (a number-average molecular weight of 1,000 and a molecular weight distribution of 1.1) represented by $HOCH_2CF_2CF_2O(CF_2CF_2CF_2O)_yCF_2CF_2CH_2OH$ (in the formula, y indicating the average degree of polymerization is 4.4) was used in place of the compound (a number-average molecular weight of 1,000 and a molecular weight distribution of 1.1) represented by $HOCH_2CF_2O(CF_2CF_2O)_xCF_2CH_2OH$ (in the formula, x indicating the average degree of polymerization is 7.1);

(ii) unlike Example 1, 3.84 g (a molecular weight of 320.38, 12.0 mmol) of a compound represented by the following Formula (26) was used in place of the compound represented by Formula (13);

(iii) unlike Example 1, 1.42 g (a molecular weight of 356.1, 4.0 mmol) of the compound represented by Formula (25) was used in place of the compound represented by Formula (15).

As a result, 3.39 g of the compound represented by Formula (F) (in Formula (F), yf1 and yf2 indicating the average degree of polymerization are both 4.4) was obtained.

(26)

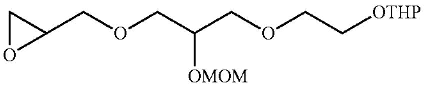

(in Formula (26), THP is a tetrahydropyranyl group, and MOM is a methoxymethyl group).

The compound represented by Formula (26) was synthesized by the following method.

A tert-butyldimethylsilyl (TBS) group as a protecting group was introduced into the primary hydroxyl group of 3-allyloxy-1,2-propanediol, and a methoxymethyl (MOM) group as a protecting group was introduced into the secondary hydroxyl group of the obtained compound. Then, the TBS group was removed from the compound, and the produced primary hydroxyl group was reacted with 2-(2-bromoethoxy)tetrahydro-2H-pyran. The double bond of the obtained compound was oxidized. Through the above processes, the compound represented by Formula (26) was obtained.

The obtained compound (F) was subjected to $^1$H-NMR measurement and $^{19}$F-NMR measurement, and the structure was identified based on the following results.

$^1$H-NMR ($CD_3COCD_3$); δ[ppm]=1.5 to 1.9 (7H), 3.4 to 4.3 (49H)

$^{19}$F-NMR($CD_3COCD_3$): δ[ppm]=−84.3 (36F), −86.4 (4F), −124.2 (4F), −130.1 (18F)

Example 7

The same operation as in Example 1 was performed except for the following (i) to (iii).

(i) unlike Example 1, 20 g of a compound (a number-average molecular weight of 1,000 and a molecular weight distribution of 1.1) represented by $HOCH_2CF_2CF_2O(CF_2CF_2CF_2O)_yCF_2CF_2CH_2OH$ (in the formula, y indicating the average degree of polymerization is 4.4) was used in place of the compound (a number-average molecular weight of 1,000 and a molecular weight distribution of 1.1) represented by $HOCH_2CF_2O(CF_2CF_2O)_xCF_2CH_2OH$ (in the formula, x indicating the average degree of polymerization is 7.1);

(ii) unlike Example 1, 2.42 g (a molecular weight of 202.25, 12.0 mmol) of a compound represented by the following Formula (27) was used in place of the compound represented by Formula (13);

(iii) unlike Example 1, 1.48 g (a molecular weight of 370.13, 4.0 mmol) of a compound represented by the following Formula (28) was used in place of the compound represented by Formula (15).

As a result, 3.21 g of the compound represented by Formula (G) (in Formula (G), yg1 and yg2 indicating the average degree of polymerization are both 4.4) was obtained.

(27)

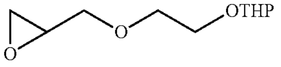

(28)

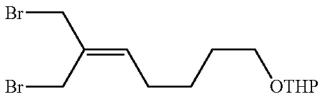

(in Formula (27), THP is a tetrahydropyranyl group).

(in Formula (28), THP is a tetrahydropyranyl group).

The compound represented by Formula (27) was synthesized by oxidizing a compound in which ethylene glycol monoallyl ether was protected using dihydropyran.

The compound represented by Formula (28) was synthesized in the same method as in the compound represented by Formula (15) except that 1,5-pentanediol was used in place of ethylene glycol as a starting substance.

The obtained compound (G) was subjected to $^{1}H$-NMR measurement and $^{19}F$-NMR measurement, and the structure was identified based on the following results.

$^{1}H$-NMR ($CD_3COCD_3$); δ[ppm]=1.5 to 1.9 (9H), 3.4 to 4.3 (37H)

$^{19}F$-NMR($CD_3COCD_3$): δ[ppm]=−84.3 (36F), −86.4 (4F), −124.2 (4F), −130.1 (18F)

Example 8

The same operation as in Example 1 was performed except for the following (i) to (iii).

(i) unlike Example 1, 20 g of a compound (a number-average molecular weight of 1,000 and a molecular weight distribution of 1.1) represented by $HOCH_2CF_2O(CF_2O)W(CF_2CF_2O)_xCF_2CH_2OH$ (in the formula, w indicating the average degree of polymerization is 4.5, and x indicating the average degree of polymerization is 4.5) was used in place of the compound (a number-average molecular weight of 1,000 and a molecular weight distribution of 1.1) represented by $HOCH_2CF_2O(CF_2CF_2O)_xCF_2CH_2OH$ (in the formula, x indicating the average degree of polymerization is 7.1);

(ii) unlike Example 1, 4.47 g (a molecular weight of 372.51, 12.0 mmol) of a compound represented by the following Formula (29) was used in place of the compound represented by Formula (13);

(iii) unlike Example 1, 1.54 g (a molecular weight of 384.16, 4.0 mmol) of a compound represented by the following Formula (30) was used in place of the compound represented by Formula (15).

As a result, 3.46 g of the compound represented by Formula (H) (in Formula (H), wh1 and wh2 indicating average degrees of polymerization are both 4.5, and xh1 and xh2 indicating average degrees of polymerization are both 4.5) was obtained.

(29)

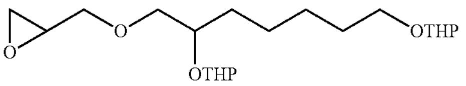

(30)

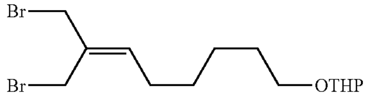

(in Formula (29), THP is a tetrahydropyranyl group).

(in Formula (30), THP is a tetrahydropyranyl group).

The compound represented by Formula (29) was synthesized by the following method. An epoxy compound was obtained by an oxidation reaction of a compound in which a hydroxyl group of 6-hepten-1-ol was protected with a tetrahydropyranyl (THP) group. The obtained epoxy compound was treated with allyl alcohol, the secondary hydroxyl group was then protected with a THP group, and an oxidation reaction was then performed to obtain a compound represented by Formula (29).

The compound represented by Formula (30) was synthesized in the same method as in the compound represented by Formula (15) except that 1,6-hexanediol was used in place of ethylene glycol as a starting substance.

The obtained compound (H) was subjected to $^{1}H$-NMR measurement and $^{19}F$-NMR measurement, and the structure was identified based on the following results.

$^{1}H$-NMR ($CD_3COCD_3$); δ[ppm]=1.5 to 1.9 (23H), 3.4 to 4.3 (45H)

$^{19}F$-NMR($CD_3COCD_3$): δ[ppm]=−55.6 to −50.6 (18F), −77.7 (4F), −80.3 (4F), −91.0 to −88.5 (36F)

Example 9

The same operation as in Example 1 was performed except for the following (i) to (iii).

(i) unlike Example 1, 20 g of a compound (a number-average molecular weight of 1,000 and a molecular weight distribution of 1.1) represented by $HOCH_2CF_2O(CF_2O)W(CF_2CF_2O)_xCF_2CH_2OH$ (in the formula, w indicating the average degree of polymerization is 4.5, and x indicating the average degree of polymerization is 4.5) was used in place of the compound (a number-average molecular weight of 1,000 and a molecular weight distribution of 1.1) represented by $HOCH_2CF_2O(CF_2CF_2O)_xCF_2CH_2OH$ (in the formula, x indicating the average degree of polymerization is 7.1);

(ii) unlike Example 1, 2.59 g (a molecular weight of 216.28, 12.0 mmol) of a compound represented by the following Formula (31) was used in place of the compound represented by Formula (13);

(iii) unlike Example 1, 1.54 g (a molecular weight of 384.16, 4.0 mmol) of the compound represented by Formula (30) was used in place of the compound represented by Formula (15).

As a result, 3.27 g of the compound represented by Formula (1) (in Formula (1), wi1 and wi2 indicating average degrees of polymerization are both 4.5, and xi1 and xi2 indicating average degrees of polymerization are both 4.5) was obtained.

(31)

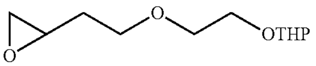

(in Formula (31), THP is a tetrahydropyranyl group).

The compound represented by Formula (31) was synthesized by the following method. It was synthesized by oxidizing the double bond of the compound obtained by reacting 3-buten-1-ol and 2-(2-bromoethoxy)tetrahydro-2H-pyran.

The obtained compound (I) was subjected to $^1$H-NMR measurement and $^{19}$F-NMR measurement, and the structure was identified based on the following results.

$^1$H-NMR ($CD_3COCD_3$); δ[ppm]=1.5 to 1.8 (15H), 3.4 to 4.2 (37H)

$^{19}$F-NMR($CD_3COCD_3$): δ[ppm]=−55.6 to −50.6 (18F), −77.7 (4F), −80.3 (4F), −91.0 to −88.5 (36F)

Example 10

The same operation as in Example 1 was performed except for the following (i) to (iii).

(i) unlike Example 1, 20 g of a compound (a number-average molecular weight of 1,000 and a molecular weight distribution of 1.1) represented by $HOCH_2CF_2O(CF_2O)_w(CF_2CF_2O)_xCF_2CH_2OH$ (in the formula, w indicating the average degree of polymerization is 4.5, and x indicating the average degree of polymerization is 4.5) was used in place of the compound (a number-average molecular weight of 1,000 and a molecular weight distribution of 1.1) represented by $HOCH_2CF_2O(CF_2CF_2O)_xCF_2CH_2OH$ (in the formula, x indicating the average degree of polymerization is 7.1);

(ii) unlike Example 1, 2.76 g (a molecular weight of 230.30, 12.0 mmol) of a compound represented by the following Formula (32) was used in place of the compound represented by Formula (13);

(iii) unlike Example 1, 1.64 g (a molecular weight of 412.22, 4.0 mmol) of a compound represented by the following Formula (33) was used in place of the compound represented by Formula (15).

As a result, 3.34 g of the compound represented by Formula (J) (in Formula (J), wj1 and wj2 indicating average degrees of polymerization are 4.5, and xj1 and xj2 indicating average degrees of polymerization are both 4.5) was obtained.

(32)

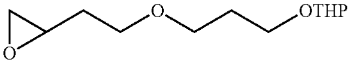

(in Formula (32), THP is a tetrahydropyranyl group).

The compound represented by Formula (32) was synthesized by the following method. It was synthesized by oxidizing the double bond of the compound obtained by reacting 3-buten-1-ol and 2-(3-bromopropoxy)tetrahydro-2H-pyran.

(33)

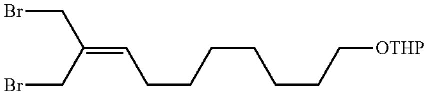

(in Formula (33), THP is a tetrahydropyranyl group).

The compound represented by Formula (33) was synthesized in the same method as in the compound represented by Formula (15) except that 1,8-octanediol was used in place of ethylene glycol as a starting substance.

The obtained compound (J) was subjected to $^1$H-NMR measurement and $^1$F-NMR measurement, and the structure was identified based on the following results.

$^1$H-NMR ($CD_3COCD_3$); δ[ppm]=1.5 to 1.9 (23H), 3.4 to 4.2 (37H)

$^{19}$F-NMR($CD_3COCD_3$): δ[ppm]=−55.6 to −50.6 (18F), −77.7 (4F), −80.3 (4F), −91.0 to −88.5 (36F)

Comparative Example 1

A compound represented by the following Formula (K) was synthesized by the method described in Patent Document 3. The compound represented by the following Formula (K) was a product of Example 2 in Patent Document 3.

(K)

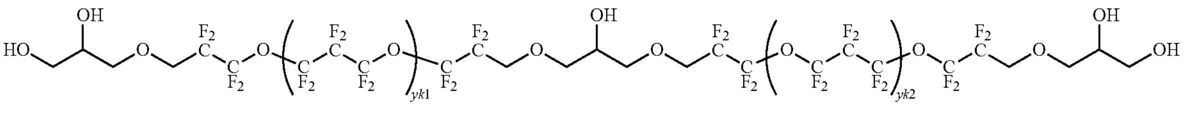

(in Formula (K), yk1 and yk2 indicating average degrees of polymerization are both 4.4).

The obtained compound (K) was subjected to $^1$H-NMR measurement and $^{19}$F-NMR measurement. and the structure was identified based on the following results.

$^1$H-NMR ($CD_3COCD_3$); δ[ppm]=3.4 to 4.2 (28H)

$^{19}$F-NMR($CD_3COCD_3$): δ[ppm]=−55.6 to −50.6 (18F), −77.7 (8F), −80.3 (8F), −91.0 to −88.5 (36F)

Comparative Example 2

The compound represented by the following Formula (L) was synthesized by the method described in Patent Document 4. The compound represented by the following Formula (L) was Compound 9 in Patent Document 4.

(L)

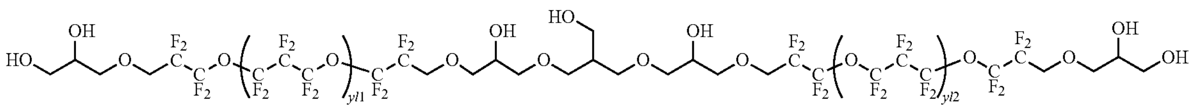

(in Formula (L), yl1 and yl2 indicating average degrees of polymerization are both 4.4).

The obtained compound (L) was subjected to $^{1}$H-NMR measurement and $^{19}$F-NMR measurement, and the structure was identified based on the following results.

$^{1}$H-NMR ($CD_3COCD_3$); δ[ppm]=3.4 to 4.4 (41H) 2.2 (1H)

$^{19}$F-NMR($CD_3COCD_3$): δ[ppm]=−55.6 to −50.6 (18F), −77.7 (8F), −80.3 (8F), −91.0 to −88.5 (36F)

Comparative Example 31

The compound represented by the following Formula (M) was synthesized by a method in which a compound (a number-average molecular weight of 2,000 and a molecular weight distribution of 1.1) represented by $HOCH_2CF_2CF_2O(CF_2CF_2CF_2O)_{ym}CF_2CF_2CH_2OH$ (in the formula, ym indicating the average degree of polymerization is 10.4) was reacted with a compound in which glycidol was protected by a tetrahydropyranyl (THP) group, and the THP group was then deprotected. The compound represented by the following Formula (M) was Compound (1) in Patent Document 1.

(M)

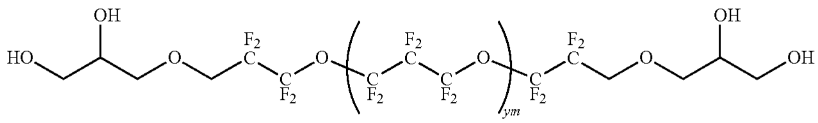

(in Formula (M), yin indicating the average degree of polymerization is 10.4).

The obtained compound (M) was subjected to $^{1}$H-NMR measurement and $^{19}$F-NMR measurement, and the structure was identified based on the following results.

$^{1}$H-NMR ($CD_3COCD_3$); δ[ppm]=3.4 to 4.2 (18H)

$^{19}$F-NMR($CD_3COCD_3$): δ[ppm]=−55.6 to −50.6 (21F), −77.7 (4F), −80.3 (4F), −91.0 to −88.5 (42F)

Comparative Example 4

The compound represented by the following Formula (N) was synthesized by the method described in Patent Document 5. The compound represented by the following Formula (N) was Compound 1 in Patent Document 5.

(N)
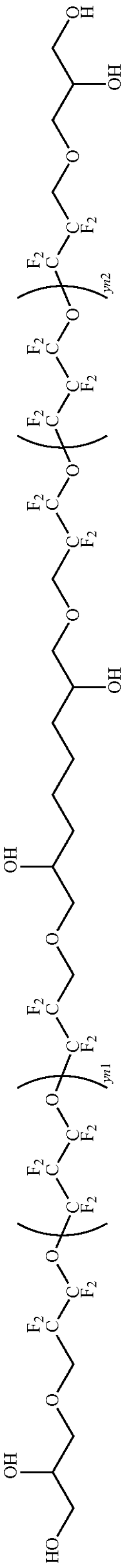

(in Formula (N), yn1 and yn2 indicating average degrees of polymerization are both 4.4).

The obtained compound (N) was subjected to $^1$H-NMR measurement and $^{19}$F-NMR measurement, and the structure was identified based on the following results.

$^1$H-NMR ($CD_3COCD_3$); δ[ppm]=3.4 to 4.4 (30H), 1.3 (8H)

$^{19}$F-NMR($CD_3COCD_3$): δ[ppm]=−55.6 to −50.6 (18F), −77.7 (8F), −80.3 (8F), −91.0 to −88.5 (36F)

Example 11

The same operation as in Example 1 was performed except that 3.17 g (a molecular weight of 264.32, 12.0 mmol) of the compound represented by the following Formula (34) was used in place of the compound represented by Formula (13). 3.26 g of the compound represented by Formula (O) (in Formula (O), xo1 and xo2 indicating average degrees of polymerization are both 7.1) was obtained.

(34)

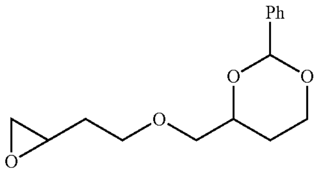

(in Formula (34), Ph is a phenyl group).

The compound represented by Formula (34) was synthesized by the following method. 1,2,4-butanetriol was reacted with benzaldehyde dimethyl acetal to synthesize a compound in which hydroxyl groups bonded to the 2$^{nd}$ and 4$^{th}$ carbon atoms of 1,2,4-butanetriol were protected. This compound and 2-(2-bromoethyl)oxirane were reacted to synthesize a compound represented by Formula (34).

The obtained compound (O) was subjected to $^1$H-NMR measurement and $^{19}$F-NMR measurement, and the structure was identified based on the following results.

$^1$H-NMR ($CD_3COCD_3$); δ[ppm]=1.5 to 1.9 (11H), 3.4 to 4.3 (41H)

$^{19}$F-NMR($CD_3COCD_3$): δ[ppm]=−77 to −80 (8F), −88 to −91 (56F)

Table 1 shows the structures of $R^1$ and $R^5$ (i and j in Formula (3-1), k and l in Formula (3-2), m in Formula (3-3), and n in Formula (3-4)), the structures of $R^2$ and $R^4$ (average degree of polymerization in Formula (5) to Formula (9)), and the structure of $R^3$ (a in Formula (2)) when the compounds of Examples 1 to 11 obtained in this manner were applied to Formula (1).

TABLE 1

| | $R^1$ | $R^2$ | $R^3$ | $R^4$ | $R^5$ | Compound |
|---|---|---|---|---|---|---|
| Example 1 | Formula (3-1) i = 1 j = 1 | Formula (6) xa1 = 7.1 | Formula (2) a = 2 | Formula (6) xa2 = 7.1 | same as $R^1$ | A |
| Example 2 | Formula (3-2) k = 1 l = 3 | Formula (6) xb1 = 7.1 | Formula (2) a = 2 | Formula (6) xb2 = 7.1 | same as $R^1$ | B |

TABLE 1-continued

| | $R^1$ | $R^2$ | $R^3$ | $R^4$ | $R^5$ | Compound |
|---|---|---|---|---|---|---|
| Example 3 | Formula (3-4) n = 1 | Formula (9) zc1 = 2.9 | Formula (2) a = 3 | Formula (9) zc2 = 2.9 | same as $R^1$ | C |
| Example 4 | Formula (3-2) k = 2 l = 3 | Formula (7) yd1 = 4.4 | Formula (2) a = 3 | Formula (7) yd2 = 4.4 | same as $R^1$ | D |
| Example 5 | Formula (3-2) k = 1 l = 2 | Formula (7) ye1 = 4.4 | Formula (2) a = 4 | Formula (7) ye2 = 4.4 | same as $R^1$ | E |
| Example 6 | Formula (3-2) k = 2 l = 1 | Formula (7) yf1 = 4.4 | Formula (2) a = 4 | Formula (7) yf2 = 4.4 | same as $R^1$ | F |
| Example 7 | Formula (3-2) k = 1 l = 1 | Formula (7) yg1 = 4.4 | Formula (2) a = 5 | Formula (7) yg2 = 4.4 | same as $R^1$ | G |
| Example 8 | Formula (3-1) i = 1 j = 4 | Formula (5) wh1 = 4.5 xh1 = 4.5 | Formula (2) a = 6 | Formula (5) wh2 = 4.5 xh2 = 4.5 | same as $R^1$ | H |
| Example 9 | Formula (3-3) m = 1 | Formula (5) wi1 = 4.5 wi1 = 4.5 | Formula (2) a = 6 | Formula (5) wi2 = 4.5 xi2 = 4.5 | same as $R^1$ | I |
| Example 10 | Formula (3-3) m = 2 | Formula (5) wj1 = 4.5 xj1 = 4.5 | Formula (2) a = 8 | Formula (5) wj2 = 4.5 xj2 = 4.5 | same as $R^1$ | J |
| Example 11 | Formula (3-5) | Formula (6) xo1 = 7.1 | Formula (2) a = 2 | Formula (6) xo2 = 7.1 | same as $R^1$ | 0 |

In addition, the number-average molecular weight (Mn) of the compounds of Examples 1 to 11 and Comparative Examples 1 to 4 was determined by the above $^1$H-NMR and $^{19}$F-NMR measurement. The results are shown in Table 2. Here, it is speculated that the value of the average molecular weight of the synthesized compound had a variation of about 1 to 5 due to the molecular weight distribution of the fluoropolyether used as a raw material for the compound, differences in operations when the compound was synthesized, and the like.

Next, a solution for forming a lubricating layer was prepared using the compounds obtained in Examples 1 to 11 and Comparative Examples 1 to 4 by the following method. Then, using the obtained solution for forming a lubricating layer, by the following method, a lubricating layer of the magnetic recording medium was formed to obtain magnetic recording media of Examples 1 to 11 and Comparative Examples 1 to 4.

"Solution for Forming Lubricating Layer"

The compounds obtained in Examples 1 to 11 and Comparative Examples 1 to 4 were each dissolved in Vertel (registered trademark) XF (product name, commercially available from Du Pont-Mitsui Fluorochemicals Co., Ltd.) as a fluorine solvent and diluted with Vertel XF so that the film thickness when applied onto the protective layer was 9 Å to 10 Å, and thereby a solution for forming a lubricating layer was obtained.

"Magnetic Recording Medium"

A magnetic recording medium in which an adhesive layer, a soft magnetic layer, a first underlayer, a second underlayer, a magnetic layer and a protective layer were sequentially provided on a substrate having a diameter of 65 mm was prepared. The protective layer was made of carbon.

The solutions for forming a lubricating layer of Examples 1 to 11 and Comparative Examples 1 to 4 were applied onto the protective layer of the magnetic recording medium in which respective layers up to the protective layer were formed by a dipping method. Here, the dipping method was performed under conditions of an immersion speed of 10 mm/see, an immersion time of 30 see, and a lifting speed of 1.2 mm/sec.

Then, the magnetic recording medium to which the solution for forming a lubricating layer was applied was put into a thermostatic chamber at 120° C. and heated for 10 minutes to remove the solvent in the solution for forming a lubricating layer, and thus a lubricating layer was formed on the protective layer to obtain a magnetic recording medium.

(Film Thickness Measurement)

The film thickness of the lubricating layer of the magnetic recording media of Examples 1 to 11, and Comparative Examples 1 to 4 obtained in this manner was measured using FT-JR (product name: Nicolet iS50, commercially available from Thermo Fisher Scientific). The results are shown in Table 2.

TABLE 2

| | Compound | Number-average molecular weight | Film thickness (Å) | Amount of Si adsorbed |
|---|---|---|---|---|
| Example 1 | (A) | 2408 | 9.0 | B |
| Example 2 | (B) | 2377 | 9.0 | B |
| Example 3 | (C) | 2511 | 9.0 | B |
| Example 4 | (D) | 2539 | 9.0 | B |
| Example 5 | (E) | 2377 | 9.0 | A |
| Example 6 | (F) | 2497 | 9.0 | A |
| Example 7 | (G) | 2363 | 9.0 | A |
| Example 8 | (H) | 2549 | 9.0 | A |
| Example 9 | (I) | 2405 | 9.0 | B |
| Example 10 | (J) | 2461 | 9.0 | B |
| Example 11 | (O) | 2436 | 9.0 | B |
| Comparative Example 1 | (K) | 2204 | 9.0 | D |
| Comparative Example 2 | (L) | 2366 | 9.0 | C |
| Comparative Example 3 | (M) | 2148 | 9.0 | D |
| Comparative Example 4 | (N) | 2284 | 9.0 | D |

Next, the magnetic recording media of Examples 1 to 11 and Comparative Examples 1 to 4 were subjected to the following chemical substance resistance test.

(Chemical Substance Resistance Test)

The contamination of the magnetic recording medium due to environmental substances that generated contamination substances in a high temperature environment was examined by the following method. Si ions were used as the environmental substances, and an amount of Si adsorbed was measured as the amount of the contamination substances that contaminated the magnetic recording medium and were produced from the environmental substances.

Specifically, the magnetic recording medium to be evaluated was held under a high temperature environment with a temperature of 85° C. and a humidity of 0% in the presence of siloxane-based Si rubber for 240 hours. Next, the amount of Si adsorbed present on the surface of the magnetic recording medium was analyzed and measured using secondary-ion mass spectrometry (SIMS), and the degree of contamination with Si ions was evaluated as the amount of Si adsorbed. The amount of Si adsorbed was evaluated as follows using a numerical value when the result of Comparative Example 1 was set as 1.00. The results are shown in Table 2.

A: less than 0.70

B: 0.70 or more and less than 0.80

C: 0.80 or more and less than 1.00

D: 1.00 or more

As shown in Table 2, the magnetic recording media of Examples 1 to 11 all had an amount of Si adsorbed of less than 0.80. Accordingly, it was confirmed that the magnetic recording media of Examples 1 to 11 exhibited excellent chemical substance resistance even if the thickness of the lubricating layer was thin.

Particularly, it was confirmed that, in Examples 5, 6, 7, and 8 using a compound in which a in Formula (2) was 4 to 6, the amount of Si adsorbed was less than 0.70, and excellent chemical substance resistance was exhibited. This is speculated to be due to the following reasons <1> and <2>.

<1> It is speculated that, since the interaction between the protective layer and the compound in which a in the substituent represented by Formula (2) contained in the lubricating layer was an integer of 4 to 6 was strong, the coverage of the lubricating layer was favorable.

<2> In Examples 5, 6, 7, and 8, the number of hydroxyl groups that were not involved in binding between the lubricating layer and active sites on the protective layer was smaller than that in the other examples. Therefore, it is speculated that the hydroxyl groups that were not involved in interaction between the lubricating layer and active sites on the protective layer were inhibited from attracting environmental substances that generate contamination substances.

On the other hand, in Comparative Example 1, a compound (K) was used in which a glycerin structure was disposed in the center of the chain structure, a perfluoropolyether chain and a terminal group having two hydroxyl groups were bonded to both sides of the structure in that order, and a hydroxyl group was disposed at both terminal ends of the chain structure. The amount of Si adsorbed in Comparative Example 1 was larger than in Examples 1 to 11. This is speculated that, since the interaction between the hydroxyl group disposed between the perfluoropolyether chains in the compound (K) used in Comparative Example 1 and the protective layer was weak, the coverage of the lubricating layer was insufficient. In addition, it is also conceivable that the hydroxyl group disposed between the perfluoropolyether chains in the compound (K), as the hydroxyl group that was not involved in interaction between the lubricating layer and active sites on the protective layer, attracted environmental substances that generate contamination substances, and thus chemical substance resistance could be lowered.

In addition, in Comparative Example 2, a compound (L) was used in which one primary hydroxyl group and two secondary hydroxyl groups were disposed in the center of the chain structure, a perfluoropolyether chain and a terminal group having two hydroxyl groups were bonded to both sides thereof in that order, and a hydroxyl group was disposed at both terminal ends of the chain structure. The amount of Si adsorbed in Comparative Example 2 was larger than in Examples 1 to 11. It is speculated that the hydroxyl groups, which were located between the perfluoropolyether chains in the compound (L) used in Comparative Example 2, as the hydroxyl groups that were not involved in interaction between the lubricating layer and active sites on the protective layer, attracted environmental substances that generate contamination substances.

In addition, in Comparative Example 3, a compound (M) was used in which a terminal group having two hydroxyl groups was bonded to both sides of the perfluoropolyether chain, and a hydroxyl group was disposed at both terminal ends of the chain structure. In Comparative Example 3, the amount of Si adsorbed was larger than in Examples 1 to 11. This is speculated to be caused by insufficient interaction between the lubricating layer and the protective layer and an insufficient coverage of the lubricating layer because the compound (M) used in Comparative Example 3 had a structure having no hydroxyl group in the center of the chain structure.

In addition, in Comparative Example 4, a compound (N) was used in which two secondary hydroxyl groups were disposed in the center of the chain structure, a perfluoropolyether chain and a terminal group having two hydroxyl groups were bonded to both sides in that order, and a hydroxyl groups was disposed at both terminal ends of the chain structure. The amount of Si adsorbed in Comparative Example 4 was larger than in Examples 1 to 11. It is speculated that the two secondary hydroxyl groups, which were located between the perfluoropolyether chains in the compound (N) used in Comparative Example 4, attracted environmental substances that generate contamination substances, as the hydroxyl groups that were not involved in interaction between the lubricating layer and active sites on the protective layer.

INDUSTRIAL APPLICABILITY

When the lubricant for a magnetic recording medium containing the fluorine-containing ether compound of the present invention is used, it is possible to form a lubricating layer having excellent chemical substance resistance even if the thickness is thin.

REFERENCE SIGNS LIST

10 Magnetic recording medium
11 Substrate
12 Adhesive layer
13 Soft magnetic layer
14 First underlayer
15 Second underlayer
16 Magnetic layer
17 Protective layer
18 Lubricating layer

The invention claimed is:

1. A fluorine-containing ether compound represented by Formula (1) shown below, $$R^1—CH_2—R^2—CH_2—OCH_2—CHR^3—CH_2O—CH_2—R^4—CH_2—R^5 \quad (1)$$

(in Formula (1), $R^2$ and $R^4$ are a perfluoropolyether chain; $R^1$ and $R^5$ are terminal groups which contain two or three hydroxyl groups, and in which respective hydroxyl groups are bonded to different carbon atoms, and carbon atoms to which the hydroxyl groups are bonded are bonded to each other via a linking group containing a carbon atom to which no hydroxyl group is bonded; and $R^3$ is represented by Formula (2) shown below):

$$—(CH_2)_a—OH \quad (2)$$

(in Formula (2), a is an integer of 2 to 8).

2. The fluorine-containing ether compound according to claim 1, wherein, in Formula (2), a is an integer of 3 to 6.

3. The fluorine-containing ether compound according to claim 1, wherein, in Formula (1), $R^1$ and $R^5$ are each independently represented by any of Formulae (3-1) to (3-5) shown below:

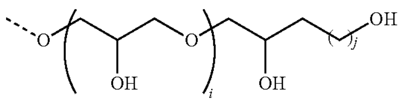

(3-1)

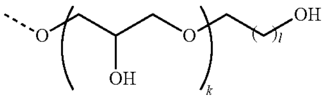

(3-2)

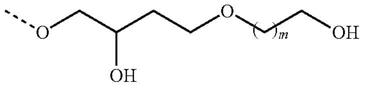

(3-3)

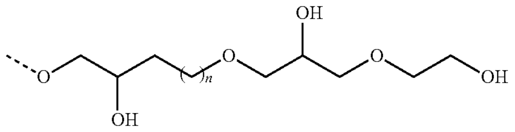

(3-4)

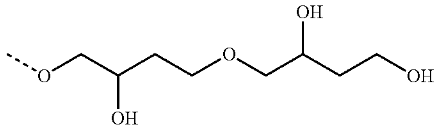

(3-5)

(in Formula (3-1), i is an integer of 0 to 1, and j is an integer of 1 to 4)

(in Formula (3-2), k is an integer of 1 to 2, and l is an integer of 1 to 3)

(in Formula (3-3), m is an integer of 1 to 3)

(in Formula (3-4), n is an integer of 1 to 2).

4. The fluorine-containing ether compound according to claim 1, wherein, in Formula (1), $R^2$ and $R^4$ are each independently represented by Formula (4) shown below:

$$—(CF_2)_vO—(CF_2O)_w—(CF_2CF_2O)_x—(CF_2CF_2CF_2O)_y—(CF_2CF_2CF_2CF_2O)_z—(CF_2)_{v'}— \quad (4)$$

(in Formula (4), w, x, y, and z indicate an average degree of polymerization, and are each independently a real number of 0 to 20; w, x, y, and z are not all 0 at the same time; v and v' are an average value indicating the number of $—CF_2—$'s, and are each independently a real number of 1 to 3; and the arrangement order of repeating units in Formula (4) is not particularly limited).

5. The fluorine-containing ether compound according to claim 1, wherein, in Formula (1), $R^2$ and $R^4$ are each independently represented by any of Formulae (5) to (9) shown below:

$$—CF_2O—(CF_2O)_{w5}—(CF_2CF_2O)_{x5}—CF_2— \quad (5)$$

(in Formula (5), w5 and x5 indicate an average degree of polymerization and each independently are real numbers of 1 to 20)

$$—CF_2O—(CF_2CF_2O)_{x6}—CF_2— \quad (6)$$

(in Formula (6), x6 indicates an average degree of polymerization, and is a real number of 1 to 20)

$$—CF_2CF_2O—(CF_2CF_2CF_2O)_{y7}—CF_2CF_2— \quad (7)$$

(in Formula (7), y7 indicates an average degree of polymerization, and is a real number of 1 to 20)

$$(CF_2)_{v8}O—(CF_2CF_2O)_{x8}—(CF_2CF_2CF_2O)_{y8}—(CF_2)_{v8'}— \quad (8)$$

(in Formula (8), x8 and y8 indicate an average degree of polymerization and each independently are real numbers of 1 to 20; and v8 and v8' are an average value indicating the number of-$CF_2$-'s, and each independently are real numbers of 1 to 2)

$$—CF_2CF_2CF_2O—(CF_2CF_2CF_2CF_2O)_{z9}—CF_2CF_2CF_2— \quad (9)$$

(in Formula (9), z9 indicates an average degree of polymerization, and is a real number of 1 to 20).

6. The fluorine-containing ether compound according to claim 1, wherein, in Formula (1), $R^1$ and $R^5$ are the same.

7. The fluorine-containing ether compound according to claim 1, wherein, in Formula (1), $R^2$ and $R^4$ are the same.

8. The fluorine-containing ether compound according to claim 1, which has a number-average molecular weight in a range of 500 to 10,000.

9. A lubricant for a magnetic recording medium, which contains the fluorine-containing ether compound according to claim 1.

10. A magnetic recording medium in which at least a magnetic layer, a protective layer, and a lubricating layer are sequentially provided on a substrate, wherein the lubricating layer contains the fluorine-containing ether compound according to claim 1.

11. The magnetic recording medium according to claim 10, wherein the lubricating layer has an average film thickness of 0.5 nm to 2.0 nm.

* * * * *